(12) United States Patent
Kimura

(10) Patent No.: US 8,239,577 B2
(45) Date of Patent: Aug. 7, 2012

(54) IMAGE FORMING SYSTEM, IMAGE TRANSMITTING APPARATUS, AND IMAGE TRANSMITTING SYSTEM INCLUDING A SPEED PRIORITY OPERATION MODE AND A QUALITY PRIORITY OPERATION MODE

(75) Inventor: Shunichi Kimura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1235 days.

(21) Appl. No.: 11/515,860

(22) Filed: Sep. 6, 2006

(65) Prior Publication Data
US 2007/0057828 A1 Mar. 15, 2007

(30) Foreign Application Priority Data

Sep. 12, 2005 (JP) ................................. 2005-263641
Sep. 12, 2005 (JP) ................................. 2005-263642
Sep. 12, 2005 (JP) ................................. 2005-263643
Jul. 12, 2006 (JP) ................................. 2006-191682

(51) Int. Cl.
*G06F 15/16* (2006.01)
*G06K 15/00* (2006.01)
*G06F 3/12* (2006.01)

(52) U.S. Cl. ...................... 709/247; 358/1.14; 358/1.15

(58) Field of Classification Search ................ 358/1.15, 358/1.14; 709/247
See application file for complete search history.

(56) References Cited

U.S. PATENT DOCUMENTS

| | | | |
|---|---|---|---|
| 5,682,554 A * | 10/1997 | Harrell | 710/57 |
| 6,678,420 B1 | 1/2004 | Takeo et al. | |
| 7,551,175 B2 * | 6/2009 | Sakanishi et al. | 345/530 |
| 2003/0076534 A1 * | 4/2003 | Li et al. | 358/1.16 |
| 2003/0133617 A1 | 7/2003 | Mukherjee | |
| 2004/0004739 A1 * | 1/2004 | Koike et al. | 358/1.16 |

(Continued)

FOREIGN PATENT DOCUMENTS

JP A-2000-78576 3/2000

(Continued)

OTHER PUBLICATIONS

David S. Taubman et al.; "JPEG2000: Image Compression Fundamentals, Standards and Practice;" *The Kluwer International Series in Engineering and Computer Science*; 2002; pp. 332-339.

(Continued)

*Primary Examiner* — Benny Q Tieu
*Assistant Examiner* — Eric A Rust
(74) *Attorney, Agent, or Firm* — Oliff & Berridge, PLC

(57) ABSTRACT

An image forming system includes a host device and a terminal device connected to the host device. The host device includes a compressing unit, a code-stream transmitting unit, a control-signal receiving unit and a first controller. The code-stream transmitting unit transmits a code stream generated by the compressing unit. The control-signal receiving unit receives a control signal transmitted by the terminal device. The first controller controls the code-stream transmitting unit according to the received control signal. The terminal device includes a code-stream receiving unit, a decompressing unit, a reproduction-image outputting unit, a second controller and a control signal transmitting unit. The decompressing unit generates reproduction image data from the received code stream. The second controller restricts receiving operation of the code-stream receiving unit according to a predetermined condition. The control-signal transmitting unit transmits the control signal when the second controller restricts the receiving operation of the code-stream receiving unit.

15 Claims, 18 Drawing Sheets

U.S. PATENT DOCUMENTS

| | | |
|---|---|---|
| 2004/0013310 A1 | 1/2004 | Suino et al. |
| 2004/0114814 A1* | 6/2004 | Boliek et al. .................. 382/233 |
| 2005/0074174 A1 | 4/2005 | Ishikawa |
| 2006/0132866 A1* | 6/2006 | Okamoto ...................... 358/502 |
| 2008/0131013 A1* | 6/2008 | Suino et al. ................... 382/240 |

FOREIGN PATENT DOCUMENTS

| | | |
|---|---|---|
| JP | A-2003-114778 | 4/2003 |
| JP | A-2003-174566 | 6/2003 |
| JP | 2003-219072 A | 7/2003 |
| JP | A-2003-264680 | 9/2003 |
| JP | 2004-056260 A | 2/2004 |
| JP | 2004-234498 A | 8/2004 |
| JP | A-2004-234563 | 8/2004 |
| JP | A-2005-027066 | 1/2005 |
| JP | A-2005-130470 | 5/2005 |
| JP | A-2005-515727 | 5/2005 |

OTHER PUBLICATIONS

Office Action issued in JP Application No. 2006-191682 on Nov. 17, 2010 (with English translation).

Office Action issued Jan. 31, 2011 in Japanese Patent Application No. 2006.191682 (with English translation).

* cited by examiner

*FIG. 9*

|  | CONTROL SIGNAL OUTPUT CONDITION |
|---|---|
| FAST MODE | DATA AMOUNT/RECEPTION TIME |
| HIGH IMAGE QUALITY MODE | DATA AMOUNT | ered by the code-stream receiving unit. The reproduction-
IMAGE FORMING SYSTEM, IMAGE TRANSMITTING APPARATUS, AND IMAGE TRANSMITTING SYSTEM INCLUDING A SPEED PRIORITY OPERATION MODE AND A QUALITY PRIORITY OPERATION MODE

BACKGROUND

1. Technical Field

The invention relates to an image forming system that forms an image from compressed image data, and an image transmitting device and an image transmitting system that transmit the compressed image data.

2. Description of the Related Art

A print system including a host computer for compressing and transmitting image data and a printer for receiving the compressed image data and printing an image has been known.

SUMMARY

According to an aspect of the invention, an image forming system includes a host device and a terminal device connected to the host device. The host device includes a compressing unit, a code-stream transmitting unit, a control-signal receiving unit and a first controller. The compressing unit generates a code stream including an embedded bit stream from original image data. The code-stream transmitting unit transmits the code stream generated by the compressing unit. The control-signal receiving unit receives a control signal transmitted by the terminal device. The first controller controls the code-stream transmitting unit in accordance with the control signal received by the control-signal receiving unit. The terminal device includes a code-stream receiving unit, a decompressing unit, a reproduction-image outputting unit, a second controller and a control-signal transmitting unit. The code-stream receiving unit receives the code stream transmitted by the code-stream transmitting unit. The decompressing unit generates reproduction image data from the code stream received by the code-stream receiving unit. The reproduction-image outputting unit receives the reproduction image data generated by the decompressing unit and outputs a reproduction image based on the reproduction image data. The second controller restricts receiving operation of the code-stream receiving unit according to a predetermined condition. The control-signal transmitting unit transmits the control signal when the second controller restricts the receiving operation of the code-stream receiving unit.

BRIEF DESCRIPTION OF THE DRAWINGS

Exemplary embodiments of the invention will be described in detail based on the following figures, wherein:

FIG. 9 is a table showing an output condition of a control signal in a fast mode and a high image quality mode;

DETAILED DESCRIPTION

Hereinafter, a first exemplary embodiment of the invention will be described with reference to the accompanying drawings.

Figure 1:
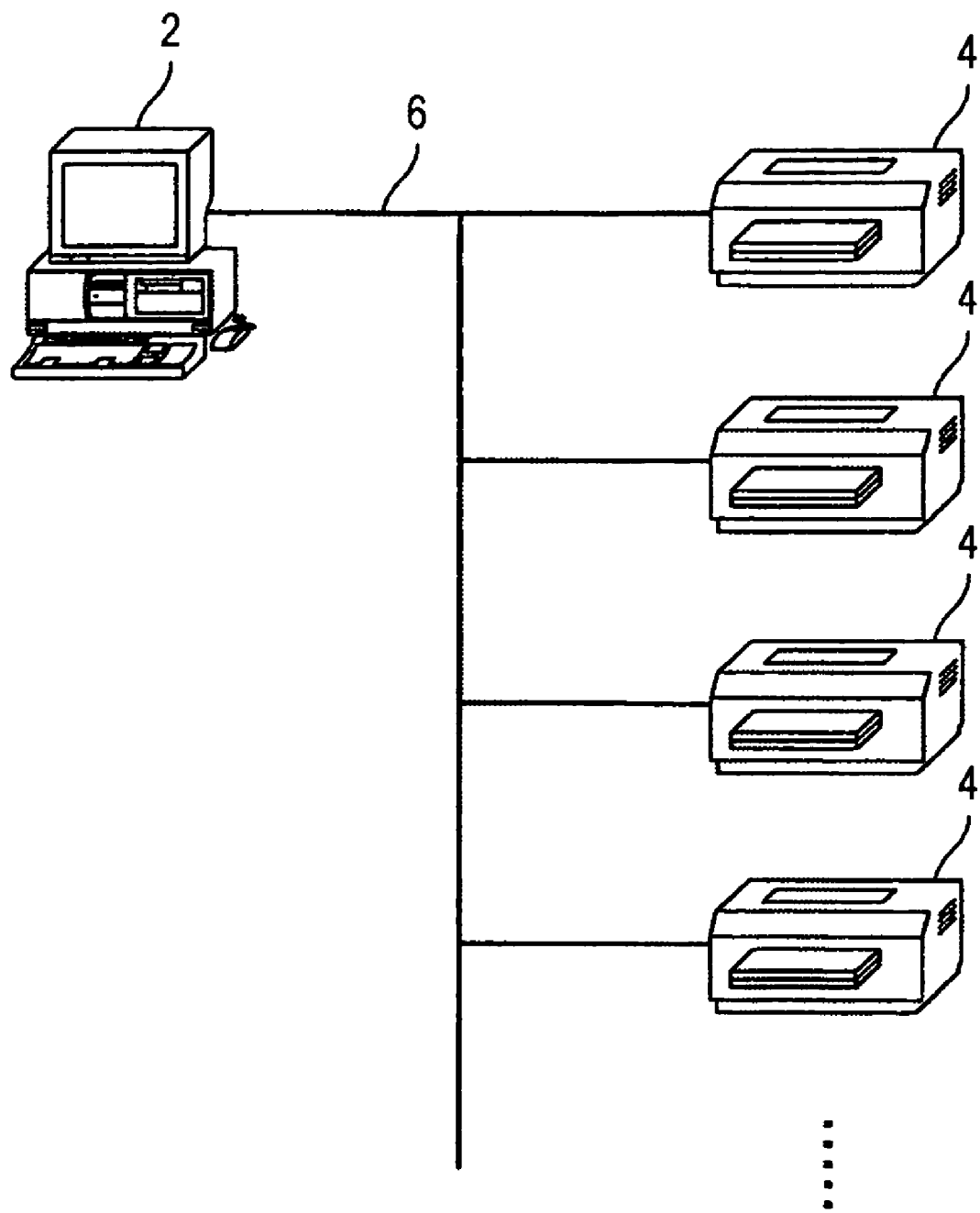
FIG. 1 is a view of an image forming system according to a first exemplary embodiment of the invention.

FIG. 1 shows an image forming system 1 according to the first exemplary embodiment of the invention. The image forming system 1 is configured so that a host device 2 such as a PC (Personal Computer) is connected to plural printers 4, which function as terminal devices, through a network 6. The host device 2 may be any terminals other than a PC, for example, a control device a control device such as an MCU (Micro Controller Unit), an input/output device such as a touch panel, and a communication device that transmits/receives a signal through the network 6. The network 6 may be wire or wireless network. Further, plural host devices 2 may be connected to the network 6.

Figure 2:
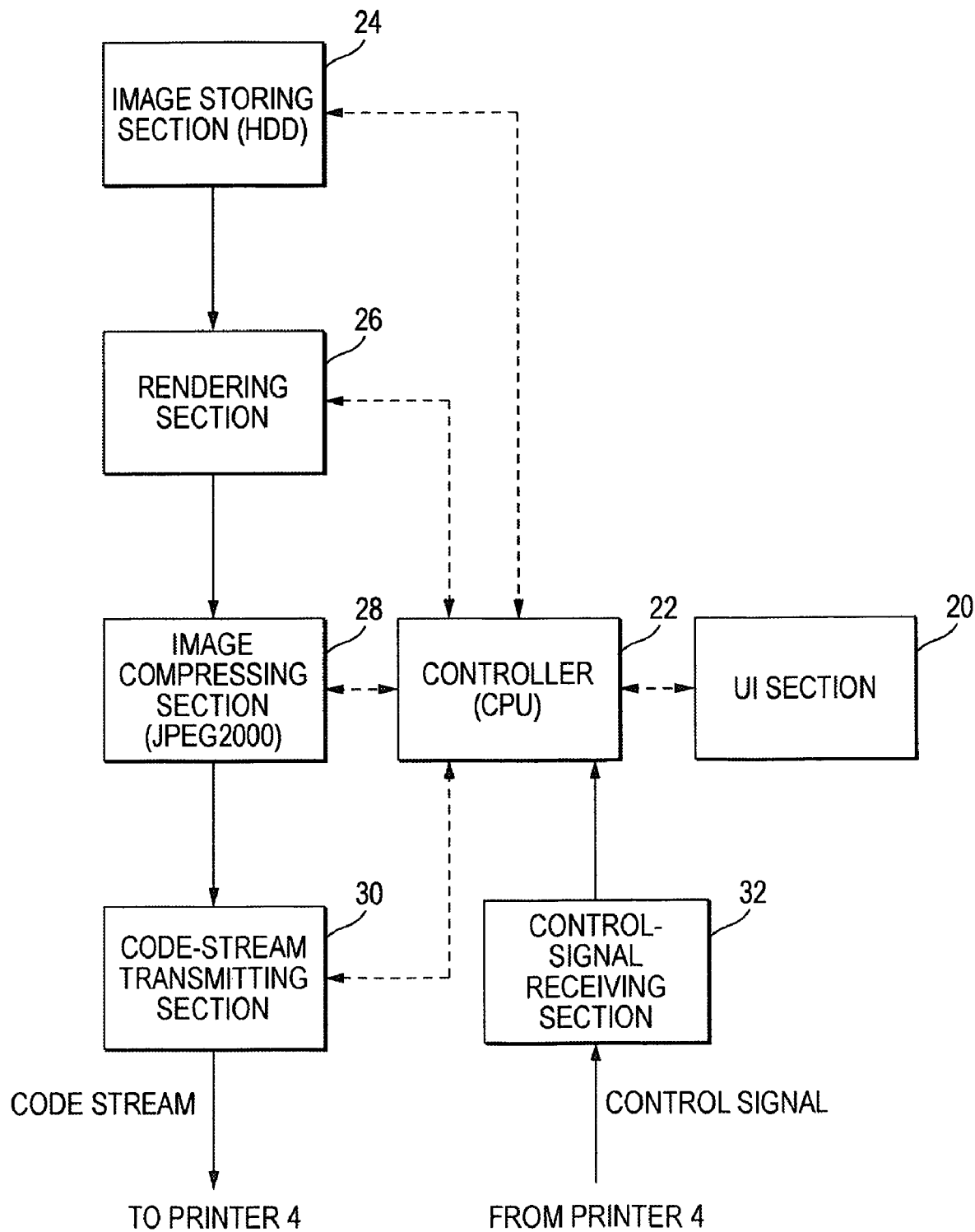
FIG. 2 is a block diagram showing a configuration of a host device.

FIG. 2 is a block diagram showing a configuration of the host device 2. As shown in FIG. 2, the host device 2 includes a user interface (UI) section 20, a control section 22, an image storing section 24, a rendering section 26, an image compressing section 28, a code-stream transmitting section 30, and a control-signal receiving section 32.

The UI section 20 may include a display and a keyboard. Further, the UI section 20 receives a user's instruction and outputs the input user's instruction to the control section 22.

The control section 22 may include a CPU, and controls each element of the host device 2 in accordance with the user's instruction input through the UI section 20 and a control signal input from the control-signal receiving section 32.

The image storing section 24 may include a storage device such as a HDD. Further, the image storing section 24 outputs image data stored therein to the rendering section 26 under the control of the control section 22. The rendering section 26 may be an application program for editing and displaying an image. Further, the rendering section 26 renders the image data input from the image storing section 24, and outputs the rendered image data to the image compressing section 28.

The image compressing section 28 generates a code stream that can be decoded by a decoding device based on JPEG2000, from the image data input from the rendering section 26. Then, the image compressing section 28 outputs the code stream (compressed image data) to the code-stream transmitting section 30.

JPEG2000 employs a coding method called EBCOT (Embedded Block Coding with Optimal Truncation). The terminology "embedded" is used in the standard of JPEG2000 (ITU-TT. 800). EBCOT is disclosed in "JPEG2000 Image Compression Fundamentals, Standards and Practice" (pp. 333-339, Kluwer Academic Publishers). The embedded coding is performed by dividing a code stream into layers in the process of coding. Since the code stream is divided into layers in advance, it is possible to obtain a decoded image with the best quality and a desired compression rate only by decoding the code stream in order of layers. That is, the embedded coding can be characterized in that the most-suitable decoding image quality can be obtained while changing a compression rate in the process of "decoding". The layers may be divided such that image quality can be uniform over the entire image.

Figure 3:
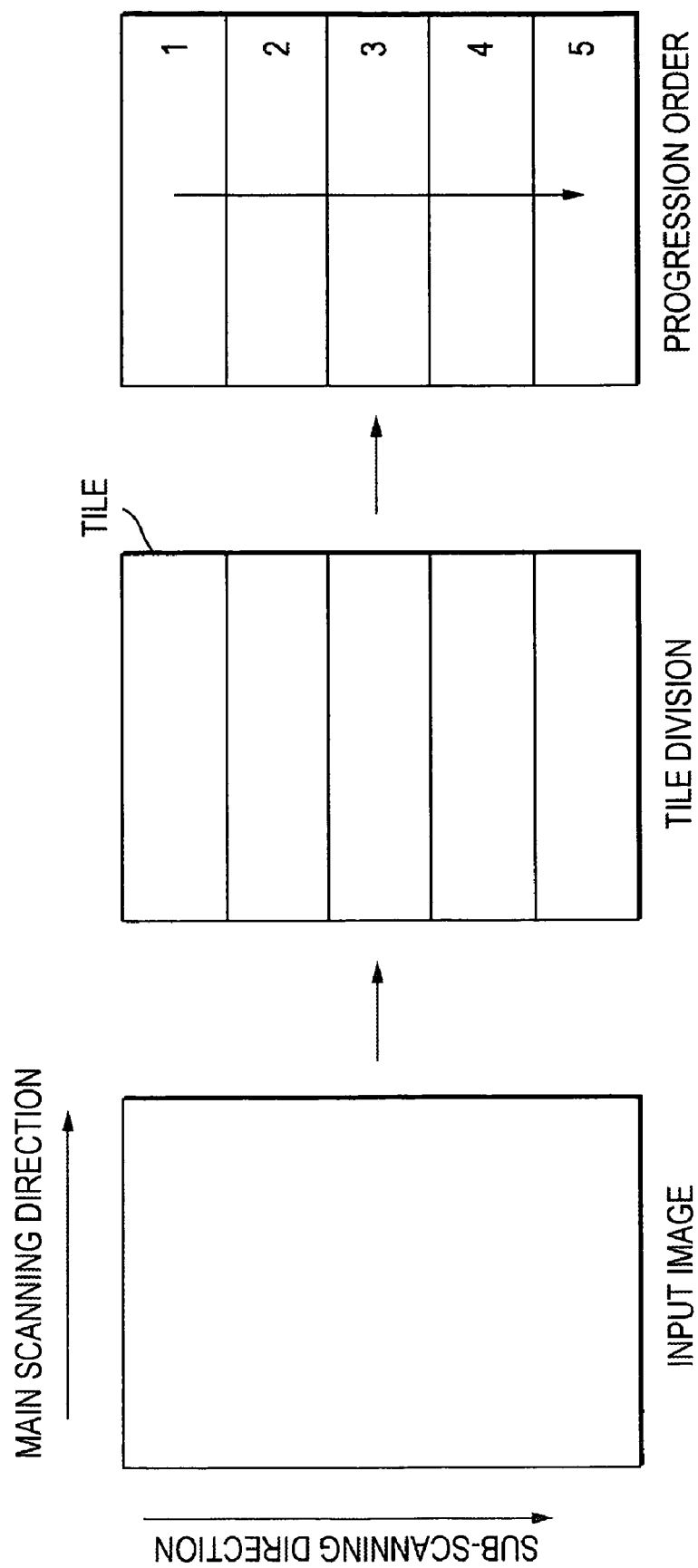
FIG. 3 is a schematic diagram showing a state in which an input image is divided into tiles and a progression order when an image compressing section compresses image data.

FIG. 3 shows a state where an input image is divided into tiles and a progression order when the image compressing section 28 compresses the image data. As shown in FIG. 3, the image compressing section 28 divides the input image into plural tiles, which are arranged in a sub-scanning direction with an image area extending in a main scanning direction being defined as a single tile. The image compression section 28 then sets a progression order so that progressive transmission is sequentially performed in the sub scanning direction and compresses the image data. The code stream output from the image compressing section 28 is packetized into plural packets Q (l, p, r, c, t) represented by five variables where "l" denotes an image quality (layer), "p" denotes a two-dimensional precinct of the image, "r" denotes a resolution, "c" denotes a component, and "t" denotes a tile number.

The code-stream transmitting section 30 (FIG. 2) sequentially transmits the code stream input from the image compressing section 28 to the printer 4 in accordance with the control by the control section 22. The control-signal receiving section 32 receives a control signal transmitted by the printer 4, and outputs the received control signal to the control section 22.

Next, a process of compressing an image, performed by the host device 2 will be described.

Figure 4:
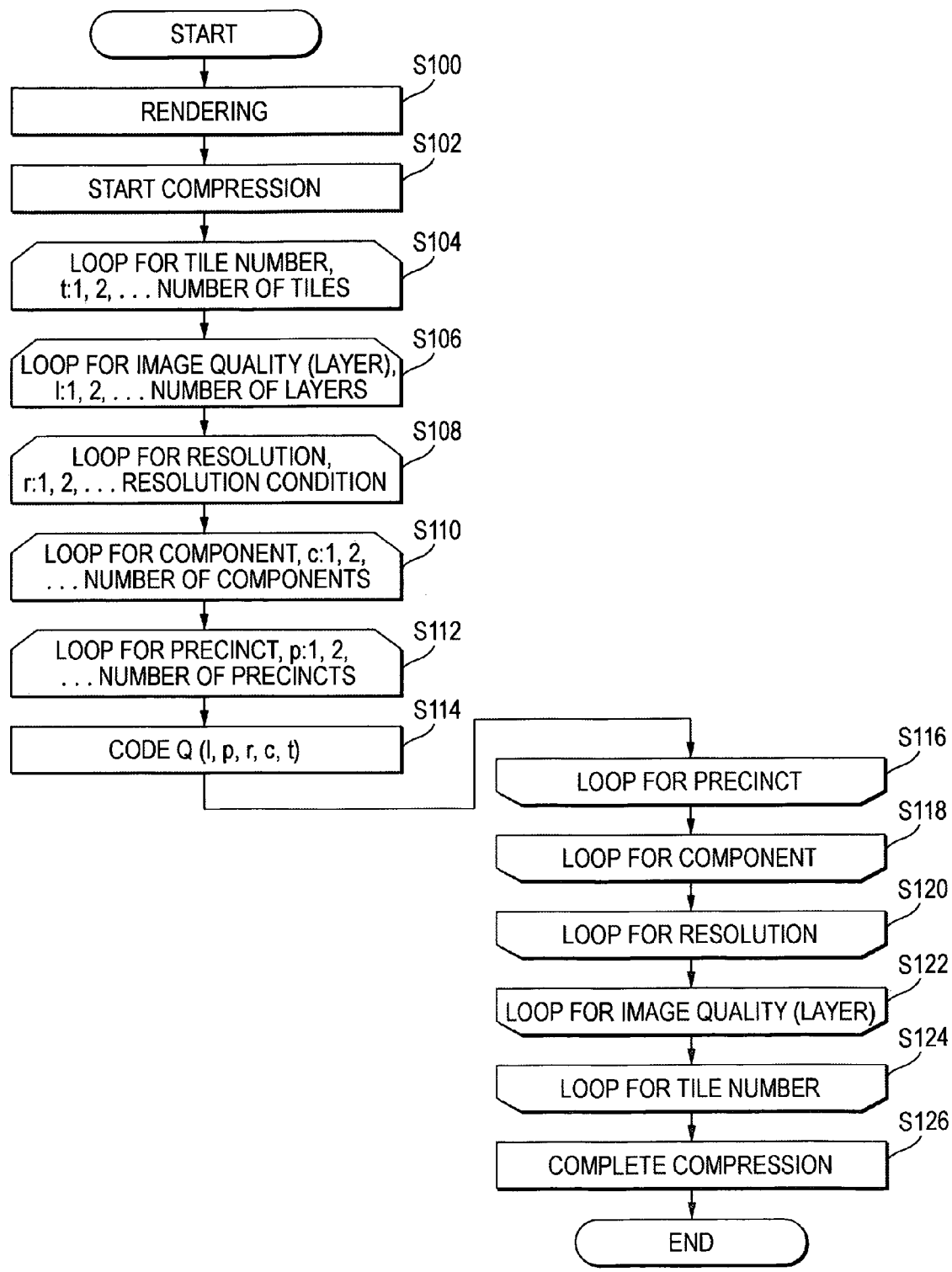
FIG. 4 is a flowchart showing a process (S10) in which the host device compresses the image data.

FIG. 4 is a flowchart showing a process (S10) in which the host device 2 compresses image data.

As shown in FIG. 4, in step 100 (S100), the rendering section 26 renders the image data input from the image storing section 24, and outputs the rendered image data to the image compressing section 28.

In step 102 (S102), the image compressing section 28 starts generating a code stream that can be decoded by a decoder based on JPEG2000, from the image data input from the rendering section 26 (begins compression based on JPEG2000).

In step 104 (S104), the image compressing section 28 starts a loop for tile number.

The image compressing section 28 begins the loop for tile number begins with a variable t equal to 1 and increments the variable t one by one while repeating processes to S124, which will be described later, until the variable t becomes equal to the number of tiles.

In step 106 (S106), the image compressing section 28 starts a loop for image quality (layer).

The image compressing section 28 begins the loop for image quality begins with a variable l equal to 1 and increments the variable l one by one while repeating processes to S122 until the variable l becomes equal to the number of layers.

In step 108 (S108), the image compressing section 28 starts a loop for resolution.

The image compressing section 28 starts the loop for resolution begins with a variable r equal to 1 and increments the variable r one by one while repeating processes to S120 until the variable r becomes equal to a predetermined resolution condition.

In step 110 (S110), the image compressing section 28 starts a loop for component.

The image compressing section 218 starts the loop for component with a variable c equal to 1 and increments the variable c one by one while repeating processes to S118 until the variable c becomes equal to the number of components.

In step 112 (S112), the image compressing section 28 starts a loop for precinct.

The image compressing section 218 starts the loop for precinct with a variable p equal to 1 and increments the variable p one by one while repeating processes to S116 until the variable p becomes equal to the number of precincts.

In step 114 (S114), the image compressing section 28 codes the packets Q (l, p, r, c, t).

In step 116 (S116), the image compressing section 28 terminates the loop for precinct if the condition of S112 is satisfied.

In step 118 (S118), the image compressing section 28 terminates the loop of component if the condition of S110 is satisfied.

In step 120 (S120), the image compressing section 28 terminates the loop for resolution if the condition of S108 is satisfied.

In step 122 (S122), the image compressing section 28 terminates the loop for image quality if the condition of S106 is satisfied.

In step 124 (S124), the image compressing section 28 terminates the loop for tile number when the condition of S104 is satisfied.

In step 126 (S126), the image compressing section 28 completes the process of generating the code stream that can be decoded by a decoding device based on JPEG2000 from the image data input from the rendering section 26 (completes compression based on JPEG2000).

As described above, the host device 2 renders image data, and compresses the rendered image data so that the progression order of the plural tiles arranged in the sub-scanning direction becomes LRCP. If the host device 2 receives a control signal from the printer 4 while sequentially transmitting the code stream to the printer 4, the host device 2 stops transmitting the code stream of a current tile number, and starts compressing the next tile.

In the progression order, the order among the loop for resolution, the loop for component and the loop for precinct may be changed so long as the loop for image quality is externally defined with respect to the loop for resolution, the loop for component and the loop for precinct.

Figure 5:
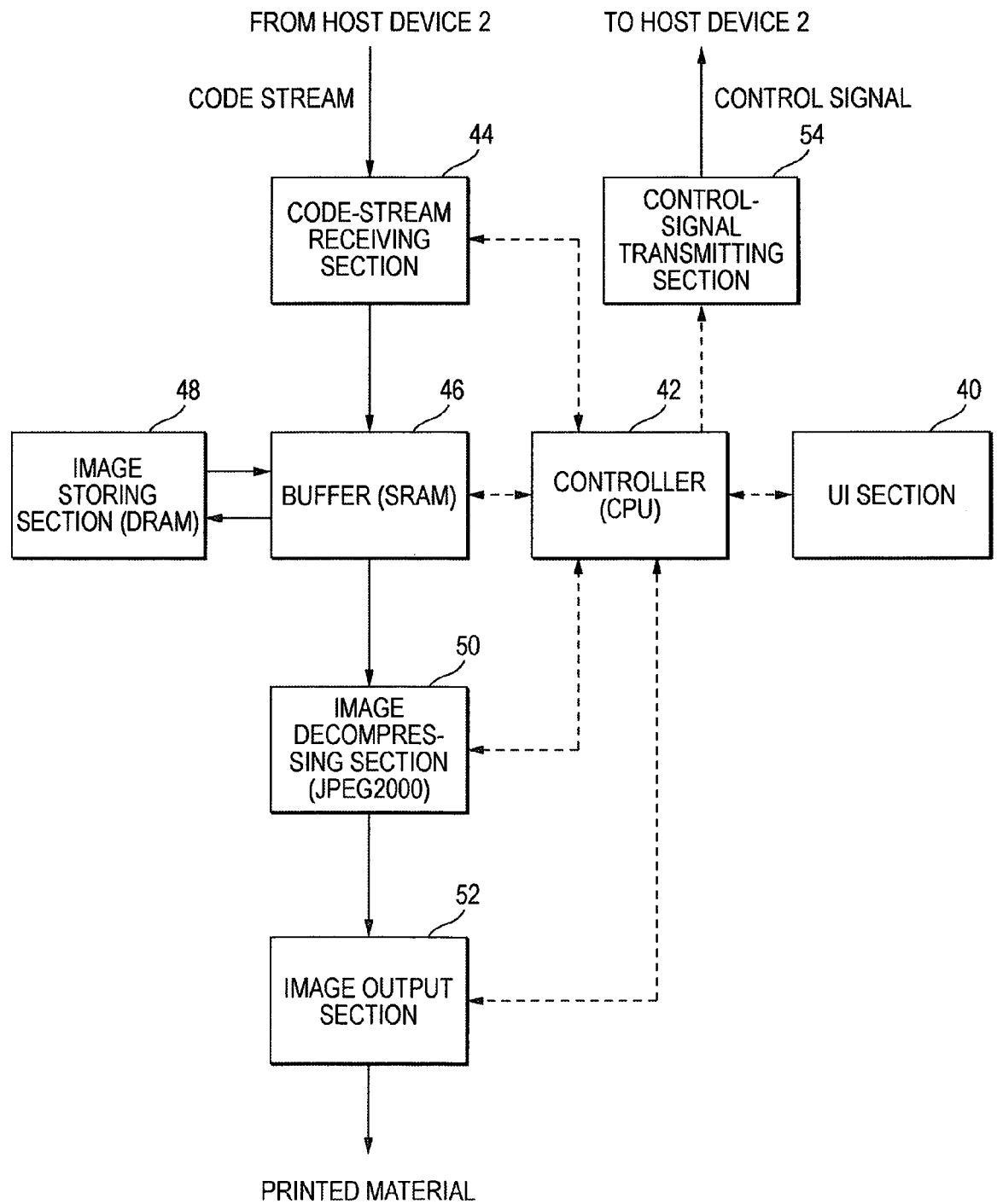
FIG. 5 is a block diagram showing a configuration of a printer.

FIG. 5 is a block diagram showing a configuration of the printer 4. As shown in FIG. 5, the printer 4 includes a user interface (UI) section 40, a controller 42, a code-stream receiving section 44, a buffer 46, an image storing section 48, an image decompressing section 50, an image output section 52 and a control-signal transmitting section 54.

The UI section 40 may include a touch panel. Further, the UI section 40 receives a user's instruction and outputs the input user's instruction to the controller 42.

The controller 42 may include a CPU, and controls each element of the printer 4. Further, the controller 42 includes a timer (not shown) and a memory (not shown), and measures a time for which the code-stream receiving section 44 receives the code stream.

The code-stream receiving section 44 receives the code stream transmitted by the host device 2, and outputs the received code stream to the buffer 46.

The buffer 46 may include a SRAM that can store a part of data corresponding to, for example, a single tile of the code stream. Further, the buffer 46 temporarily stores the code stream input from the code-stream receiving section 44 and sequentially outputs the stored code stream to the image storing section 48. In addition, the buffer 46 temporarily stores the code stream stored in the image storing section 48 and sequentially outputs the code stream to the image decompressing section 50 according to the control by the controller 42. Information indicating a storage capacity of the buffer 46 may be stored in a memory (not shown) of the controller 42.

The image storing section 48 may include a DRAM. Further, the image storing section 48 stores the code stream input from the buffer 46, and sequentially outputs the code stream to the buffer 46 according to the access from the buffer 46.

The image decompressing section 50 may be a decoding device based on JPEG2000. Further, the image decompressing section 50 decompresses the code stream sequentially input from the buffer 46 so as to reproduce image data, and outputs the reproduction image data to the image output section 52.

The image output section 52 may be a printer main body, and receives the image data from the image decompressing section 50 so as to form the image data on a recording medium such as a sheet of paper, to thereby obtain a printed material.

If the time for which the code-stream receiving section 44 receives the code stream reaches a predetermined time, the control-signal transmitting section 54 outputs a signal (control signal) indicating that a receiving time reaches the predetermined time to the host computer 2 according to the control by the controller 42. In this process, the controller 42 determines on the basis of the time for which the code-stream receiving section 44 receives the code stream, whether or not a data amount of the code stream received by the code-stream receiving section 44 reaches the storage capacity of the buffer 46. If the data amount reaches the storage capacity of the buffer 46, the controller 42 controls the control-signal transmitting section 54 to output the control signal. Further, the controller 42 may control the control-signal transmitting section 54 to transmit the control signal, on the basis of an amount of data received by the code-stream receiving section 44 (an amount of data stored in the buffer 46).

Next, a process in which the printer 4 receives the code stream and prints the reproduction image will be described.

Figure 6:
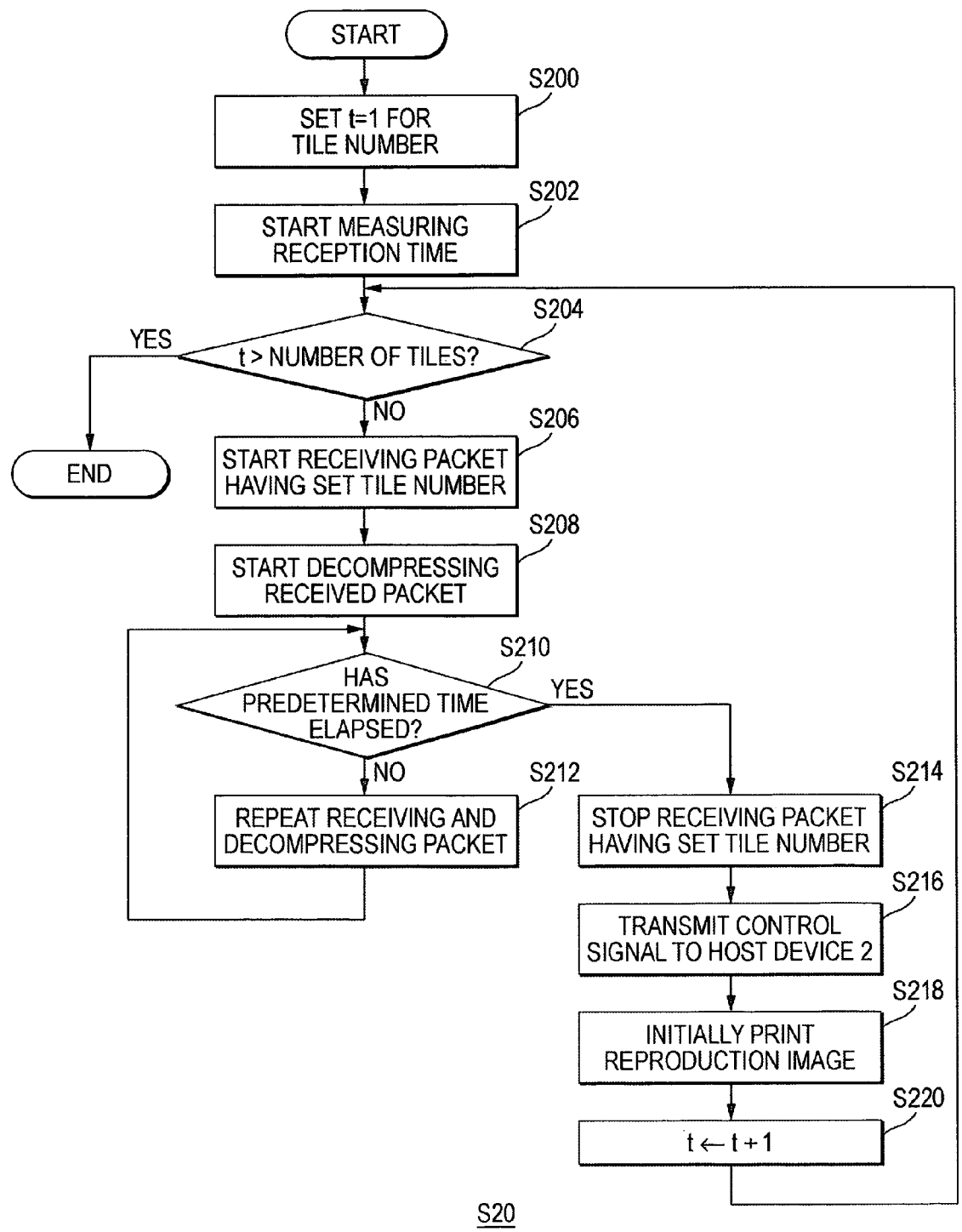
FIG. 6 is a flowchart showing a process (S20) in which a printer receives a code stream and prints a reproduction image.

FIG. 6 is a flowchart showing a process (S20) in which the printer 4 receives the code stream and prints the reproduction image.

As shown in FIG. 6, in step 200 (S200), when the host device 2 starts transmitting the code stream to the code-stream receiving section 44, the controller 42 sets a tile number t to be equal to 1 in the image decompressing section 50.

In step 202 (S202), the controller 42 starts measuring a time for which the code-stream receiving section 44 receives the code stream.

In step 204 (S204), the controller 42 determines whether or not the tile number t (variable t) is greater than a tile number included in a header of the code stream. If the tile number t is equal to or less than the tile number included in the header, the process proceeds to S206. If the tile number t is greater than the tile number included in the header, the process is terminated.

In step 206 (S206), the code-stream receiving section 44 starts receiving a packet of the tile number t currently set.

In step 208 (S208), the image decompressing section 50 starts decompressing the packet received by the printer 4.

In step 210 (S210), the controller 42 determines whether or not the time for which the code-stream receiving section 44 receives the code stream reaches the predetermined time (whether or not the predetermined time has elapsed since the code-stream receiving section 44 started receiving the code stream). If it does not reach the predetermined time, the process proceeds to S212. Otherwise, the process proceeds to S214.

In step 212 (S212), the printer 4 continues receiving and decompressing packets, and the process returns to S210.

In step 214 (S214), the controller 42 controls the code-stream receiving section 44 to stop receiving the packet of the tile number t currently set.

In step 216 S216), the control-signal transmitting section 54 transmits the control signal to the host device 2 in accordance with the control by the controller 42.

In step 218 (S218), the image output section 52 receives the packet decompressed by the image decompressing section 50 to start printing the reproduction image by.

In step 220 (S220), the controller 42 increments the tile number t by one, and set the incremented time number t to the image decompressing section 50.

As described above, when the printer 4 receives the code stream from the host device 2, the printer 4 forms images for respective tiles shown in FIG. 3 in the predetermined progression order and outputs the reproduction image with the predetermined image quality as a printed material.

Figure 7:
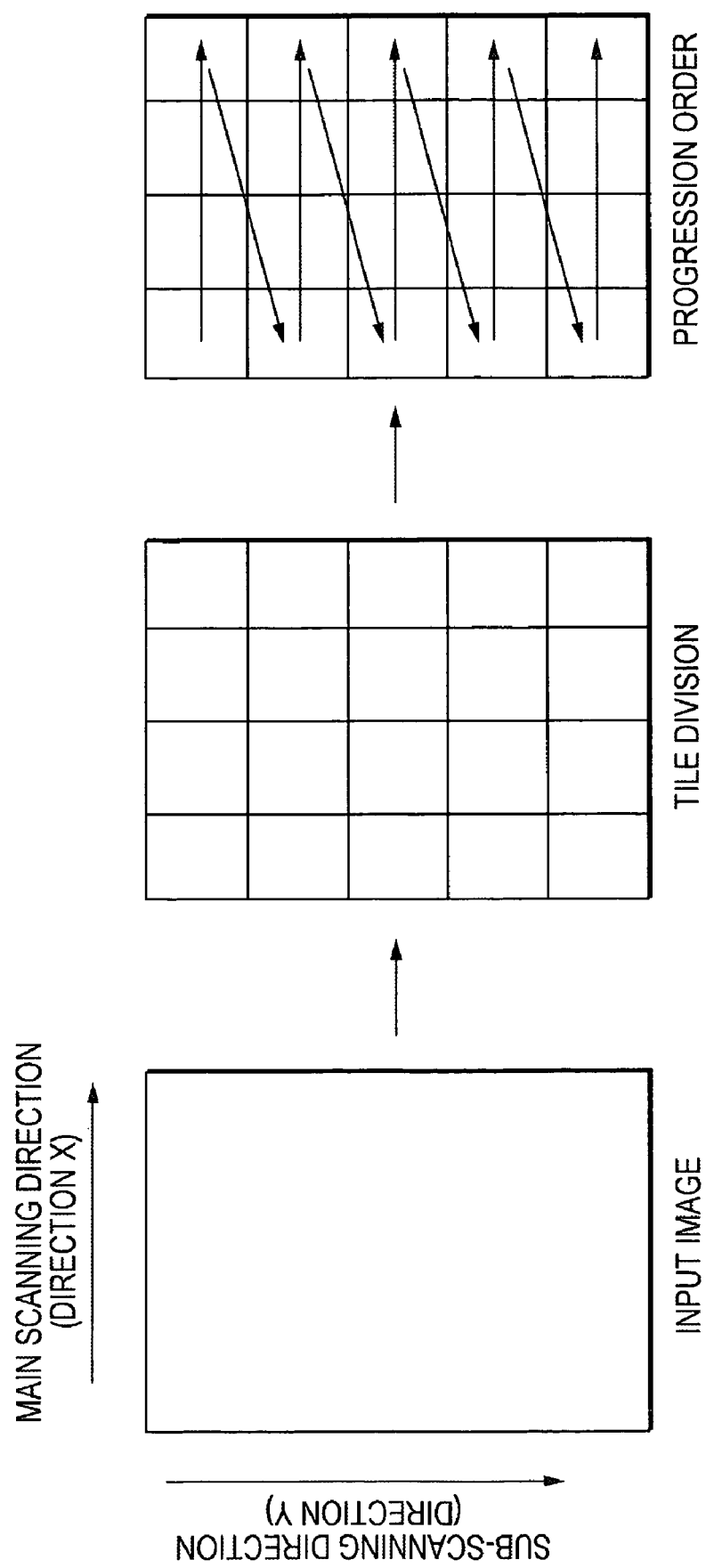
FIG. 7 is a schematic diagram showing a modified example of an input image, which is divided into tiles, and a progression order when an image compressing section comprises image data.

FIG. 7 shows a modified example of a state where an input image is divided into tiles and a progression order when the image compressing section 28 compresses image data. As shown in FIG. 7, the image compressing section 28 may divide the input image into tiles in a two-dimensional direction, that is, a main scanning direction and a sub-scanning direction. Even when the input image is divided into tiles in the two-dimensional direction, the image compressing section 28 determines a progression order so that progress transferring is sequentially performed in the raster order, to thereby compress the image data. When the input image is divided into tiles in the two-dimensional direction, the code stream output from the image compressing section 28 is packetized into plural packets Q (l, p, r, c, tx, ty) represented by six variables where "l" denotes an image quality (layer), "p" denotes a two-dimensional precinct p of an image, "r" denotes a resolution, "c" denotes a component, "tx" denotes a tile number in the main scanning direction (direction x), and "ty" denotes a tile number in the sub scanning direction (direction y).

Figure 8:
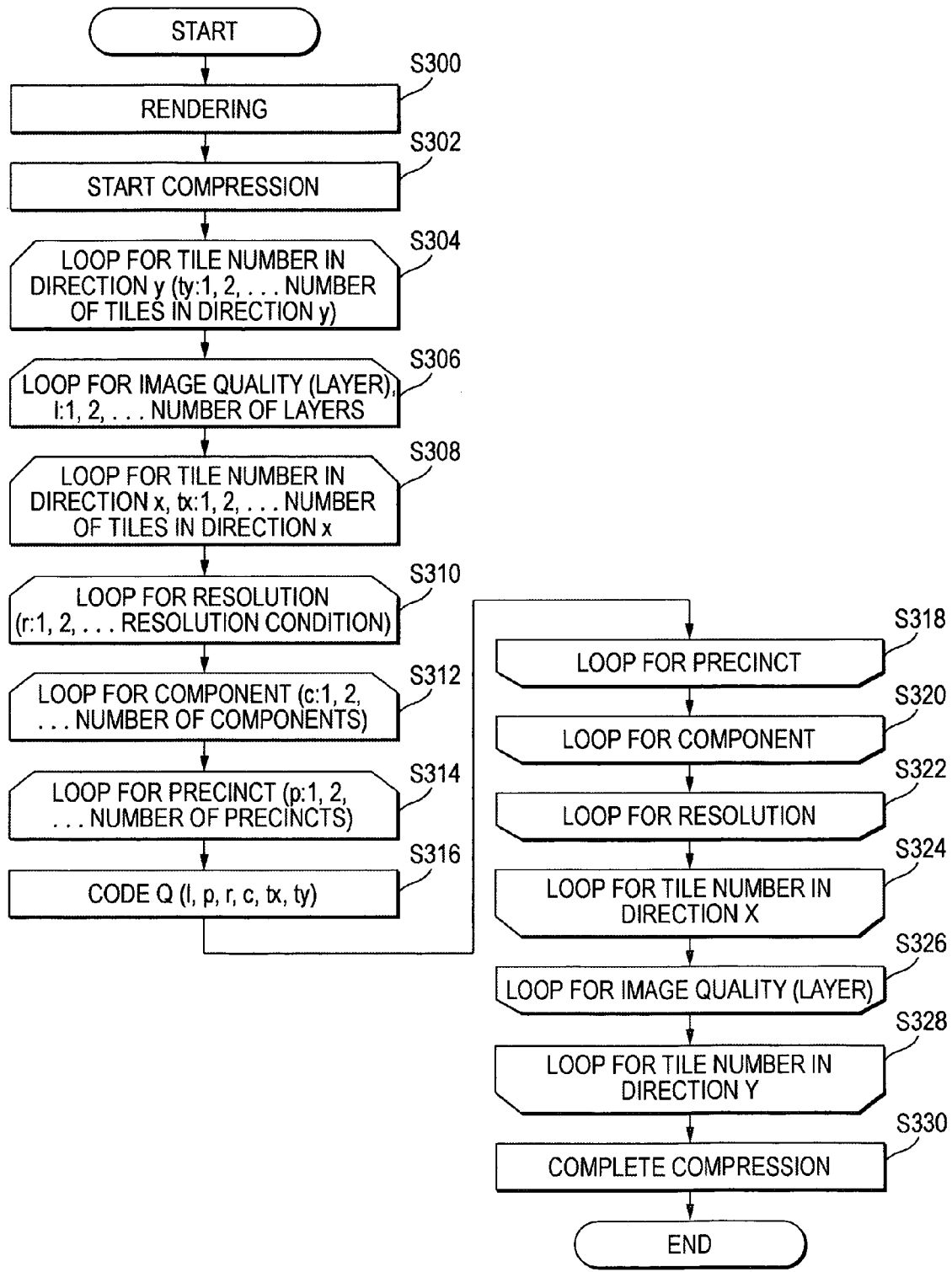
FIG. 8 is a flowchart showing a process (S30) in which the host device divides image data into tiles in a two-dimensional direction and compresses the image data.

FIG. 8 is a flowchart showing a process (S30) in which the host device 2 divides image data into tiles in the two-dimensional direction and compresses the image data.

As shown in FIG. 8, in step 300 (S300), the rendering section 26 renders the image data input from the image storing section 24, and outputs the rendered image data to the image compressing section 28.

In step 302 (S302), the image compressing section 28 starts generating a code stream that can be decoded by a decoding device based on JPEG2000, from the image data input from the rendering section 26 (begins compression based on JPEG2000).

In step 304 (S304), the image compressing section 28 starts a loop for tile number in the sub scanning direction (direction y).

The image compression section 28 starts the loop for tile number in the y direction with the variable ty equal to 1 and increments the tile number ty one by one while repeating processes to S328 until the variable ty becomes equal to the number of tiles in direction y.

In step 306 (S306), the image compressing section 28 starts a loop for image quality (layer).

The image compressing section 28 starts the loop for image quality with the variable l equal to 1 and increments the variable l one bye one while repeating processes to S326 until the variable l becomes equal to the number of layers.

In step 308 (S308), the image compressing section 28 starts a loop for tile number in the main scanning direction (direction x).

The image compressing section 28 starts the loop for tile number in the x direction with the variable tx equal to 1 and increments the variable tx one by one while repeating processes to S324 until the variable tx becomes equal to the number of tiles in direction x.

In step 310 (S310), the image compressing section 28 starts a loop for resolution.

The image compressing section 28 starts the loop for image quality with the variable r equal to 1 and increments the variable r one by one while repeating processes to S322 until the variable r becomes equal to a specific resolution condition.

In step 312 (S312), the image compressing section 28 starts a loop for component.

The image compressing section 28 starts the loop for image quality with the variable c equal to 1 and increments the variable c one by one while repeating processes to S320 until the variable c becomes equal to the number of components.

In step 314 (S314), the image compressing section 28 starts a loop for precinct.

The image compressing section 28 starts the loop for image quality with the variable p equal to 1 and increments the variable p one by one while repeating processes to S318 until the variable p becomes equal to the number of precincts.

In step 316 (S316), the image compressing section 28 codes the packets Q (l, p, r, c, tx, ty).

In step 318 (S318), the image compressing section 28 terminates the loop for precinct if the condition of S314 is satisfied.

In step 320 (S320), the image compressing section 28 terminates the loop for component if the condition of S312 is satisfied.

In step 322 (S322), the image compressing section 28 terminates the loop for resolution if the condition of S310 is satisfied.

In step 324 (S324), the image compressing section 28 terminates the loop for image quality if the condition of S308 is satisfied.

In step 326 (S326), the image compressing section 28 terminates the loop for tile number if the condition of S306 is satisfied.

In step 328 (S328), the image compressing section 28 terminates the loop for tile number if the condition of S304 is satisfied.

In step 330 (S330), the image compressing section 28 completes the process of generating the code stream that can be decoded by a decoding device based on JPEG2000 from the image data input from the rendering section 26 (completes compression based on JPEG2000).

Further, when the host device 2 divides the input image into tiles in the two-dimensional direction, the progression order becomes equivalent to the raster order. Thus, the host device 2 compresses the image data so that the printer 4 can decompress and print the compressed image data in units of image areas in which tiles are arranged in the main scanning direction.

In the image forming system 1, the buffer 46 may have the storage capacity capable of storing image data, which has a predetermined image quality and corresponds to the entire input image. The host device 2 may transmit a code stream without dividing an image into tiles (that is, with the number of tiles being equal to 1). Moreover, the image forming system 1 may be configured so as to allow a user to select either a fast mode or a high image quality mode shown in FIG. 9 through the UI section 40. Thereby, the controller 42 can switch its operation mode between the fast mode and the high image quality mode. As shown in FIG. 9, when the operation mode is switched to the fast mode according to the user's selection, the controller 42 controls the control-signal transmitting section 54 to output a control signal on the basis of the data amount of the code stream received by the code-stream receiving section 44 and the receiving time for which the code-stream receiving section 44 receives the code stream. Further, when the operation mode is switched to the high image quality mode according to the user's selection, the controller 42 controls the control-signal transmitting section 54 to output the control signal on the basis of the data amount of the code stream received by the code-stream receiving section 44. That is, the controller 42 can select which speed and image quality priority is given.

Next, a second exemplary embodiment of the invention will be described with reference to the accompanying drawings.

Figure 10:
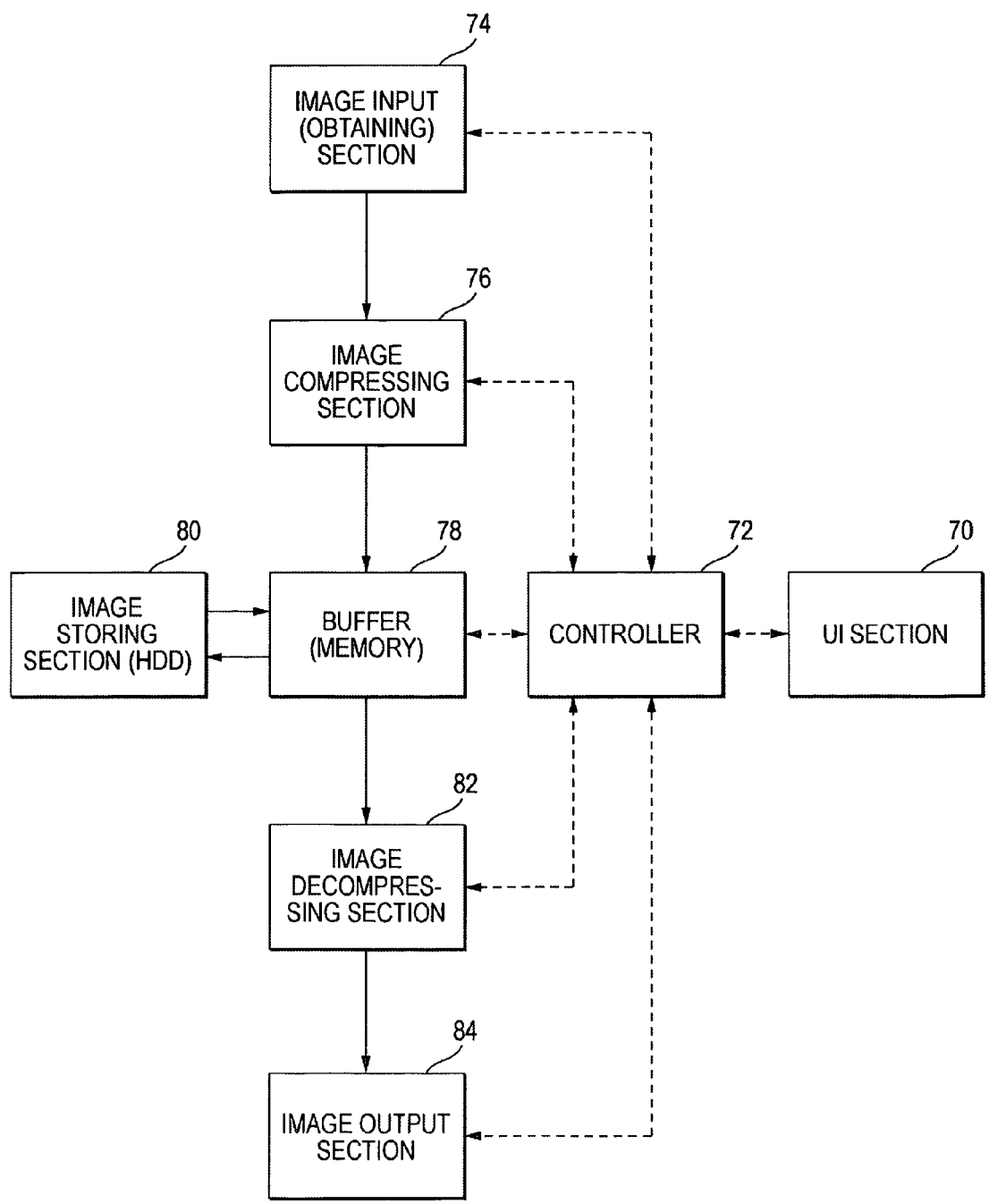
FIG. 10 is a block diagram showing an image forming system according to a second exemplary embodiment of the invention.

FIG. 10 shows an image forming system 7 according to the second exemplary embodiment of the invention. An image forming system 7 includes a user interface (UI) section 70, a controller 72, an image input (obtaining) section 74, an image compressing section 76, a buffer 78, an image storing section 80, an image decompressing section 82 and an image output section 84.

In the image forming system 7, the image input section 74, the image compressing section 76 and the image storing section 80 may be independent elements, and be connected to each other through a network.

The UI section 70 may include a touch panel. Further, the UI section 70 receives a user's instruction and outputs the input user's instruction to the controller 72. The controller 72 may include a CPU having a timer (not shown) and a memory (not shown). The controller 72 receives the user's instruction input through the UI section 70 and controls each element of the image forming system 7.

The image input (obtaining) section 74 may be a scanner. Further, the image input (obtaining) section 74 obtains image data to be stored in the image storing section 80 (which will be described later), and outputs the obtained image data to the image compressing section 76. The image input (obtaining) section 74 may be a decomposer or imager for a printing device.

The image compressing section 76 compresses the image data input from the image input section 74 into image data (code stream), which can be decoded by a decoding device based on JPEG2000, and outputs the compressed image data to the buffer 78.

The buffer 78 includes a memory that can store data whose amount equivalent to, for example, a single page of paper. Further, the buffer 78 temporarily stores the coded image data input from the image compressing section 76 and sequentially outputs the coded image data to the image storing section 80. In addition, the buffer 78 temporarily stores the code stream stored in the image storing section 80 and sequentially outputs the stored code stream to the image decompressing section 82 according to the control by the controller 72. Information indicating the storage capacity of the buffer 78 may be stored in a memory (not shown) of the controller 72.

The image storing section 80 includes a storage device such as a HDD. Further, the image storing section 80 stores the code stream input from the buffer 78, and sequentially outputs the code stream to the buffer 78 according to the access from the buffer 78.

The image decompressing section 82 may be a decoding device based on JPEG2000. Further, the image decompressing section 82 decompresses the image data (code stream) sequentially input from the buffer 78 so as to reproduce image data. Then, the image decompressing section 82 outputs the reproduction image data to the image output section 84.

The image output section 84 may be a main body of a printing device such as a printer. Further, the image output section 84 receives the reproduction image data from the image decompressing section 82 and forms the received image data on a sheet of paper, to thereby obtain a printed material.

That is, in the image forming system 7, the image compressing section 76 compresses the image data input from the image input section 74, and the image storing section 80 stores the compressed image data. Also, in the image forming system 7, the image decompressing section 82 decompresses and reproduces the coded image data (code stream) stored in the image storing section 80 according to the user's instruction input through the UI section 70 and then, the image output section 84 receives the reproduced image data and outputs the reproduction image based on the reproduced image data.

Next, a process in which the image forming system 7 reads the image data stored in the image storing section 80 and outputs the reproduction image will be described.

Figure 11:
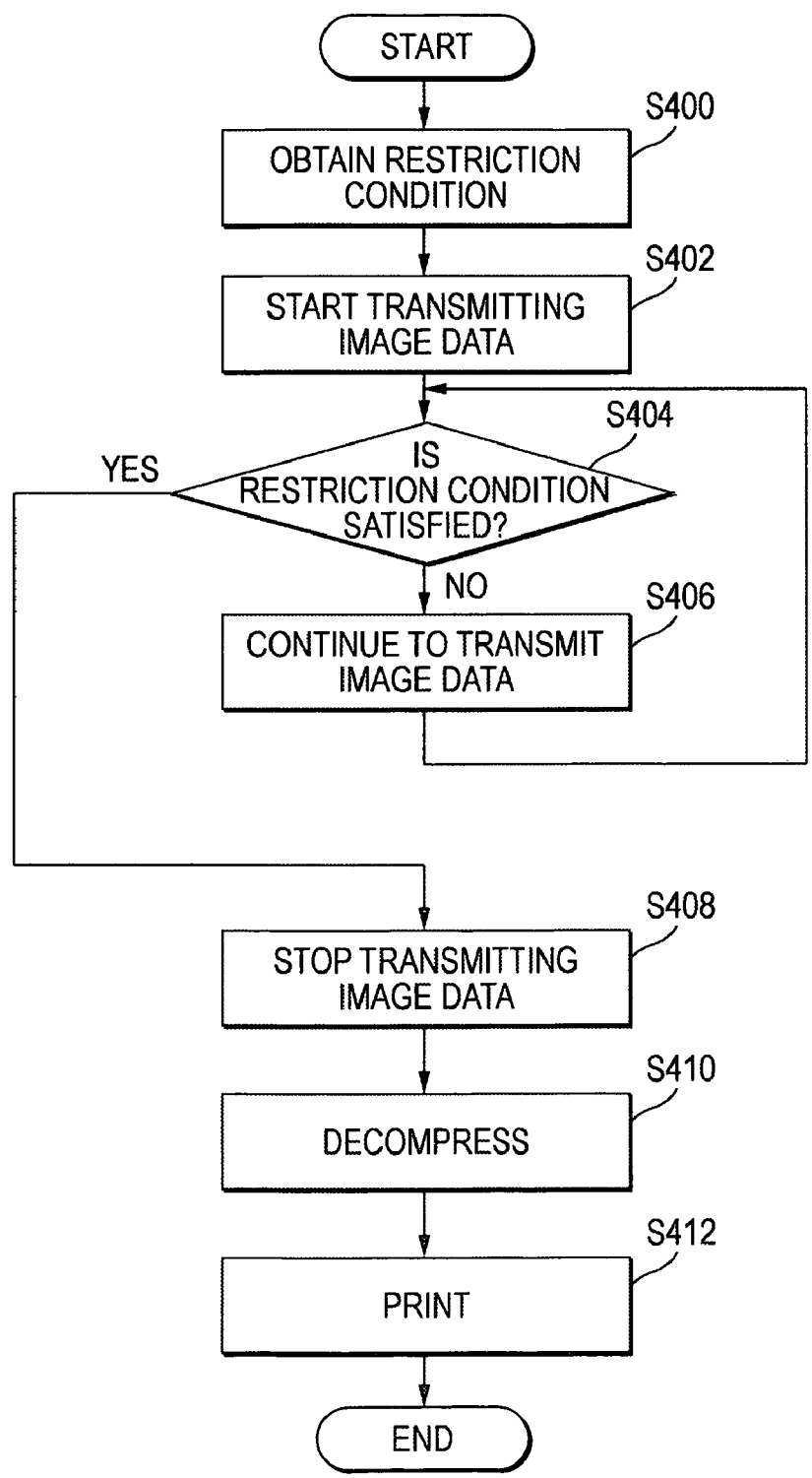
FIG. 11 is a flowchart showing a process (S40) in which an image forming system reads image data stored in an image storing section and outputs a reproduction image.

FIG. 11 is a flowchart showing a process (S40) in which the image forming system 7 reads the image data stored in the image storing section 80 and outputs the reproduction image.

As shown in FIG. 11, in step 400 (S400), the controller 72 obtains through the UI section 70 a restriction condition for the process in which the image forming system 7 outputs the reproduction image. Examples of the above restriction condition include an image quality of the reproduction image output from the image output section 84, a time required for the image output section 84 to start printing the reproduction image, and a time required for the image output section 84 to print the reproduction image.

In step 402 (S402), the controller 72 starts transmitting the image data (code stream) from the image storing section 80 to the buffer 78.

In step 404 (S404), the controller 72 determines whether or not the obtained restriction condition is satisfied. If satisfied, the process proceeds to S408, and otherwise, the process proceeds to S406. For example, if the restriction condition is the image quality of the reproduction image, the controller 72 converts the image quality of the reproduction image into a layer of JPEG2000. Then, the controller 72 determines whether or not the restriction condition is satisfied according to whether or not the converted layer of the image data, which is equivalent to a single page of paper, is transferred to the buffer 78.

In step 406 (S406), the controller 72 continues transmitting the image data from the image storing section 80 to the buffer 78.

In step 408 (S408), the controller 72 stops transmitting the image data from the image storing section 80 to the buffer 78.

In step 410 (S410), the image decompressing section 82 decompresses and reproduces the image data that is received (read) by the buffer 78 from the image storing section 80, according to the control by the controller 72. Then, the image decompressing section 82 outputs the reproduced image data to the image output section 84.

In step 412 (S412), the image output section 84 receives the reproduced image data from the image decompressing section 82, and forms the reproduction image on a sheet of paper to thereby obtain a printed material.

Although the restriction condition relates to the image quality of reproduction image in the above exemplary embodiment, the invention is not limited thereto. For example, if the restriction condition is defined in terms of the storage capacity of the buffer 78, the controller 72 determines whether or not the restriction condition is satisfied according to whether or not a data amount of the image transmitted to the buffer 78 reaches the storage capacity of the buffer 78. Alternatively, if the restriction condition relates to the time required for the image output section 84 to start printing the reproduction image or the time required for the image output section 84 to print the reproduction image, the controller 72 determines whether or not the restriction condition is satisfied on the basis of the access time and the storage capacity of the buffer 78.

Furthermore, when the access time or the storage capacity of the buffer 78 is changed because the buffer 78 is replaced, the controller 72 may check the specification of the new buffer 78 and determines whether or not the restriction condition is satisfied. The restriction condition may be a combination of plural above-described conditions.

Next, a process will be described in which the image forming system 7 compresses image data in the case where the storage capacity of the buffer 78 is less than an amount of image data, which is equivalent to a single page of paper and has a predetermined image quality. If the storage capacity of the buffer 78 is less than the amount of the image data, which is equivalent to a single page of paper and has the predetermined image quality, the image forming system 7 divides the input image into tiles to form a reproduction image on a sheet of paper.

In the case where the storage capacity of the buffer 78 is less than the amount of the image data, which is equivalent to a single page of paper and has the predetermined image quality, the image compressing section 76 defines an image area extending in a main scanning direction as a single tile. Then, the image compressing section 76 divides an input image into plural tiles arranged in the sub-scanning direction, sets a progression order so that progressive transmission is sequentially performed in the sub scanning direction and compresses the image data (see FIG. 3). The code stream output from the image compressing section 76 is packetized into plural packets Q (l, p, r, c, t) represented by five variables where "l" denotes an image quality (layer), "p" denotes a two-dimensional precinct of the image, "r" denotes a resolution, "c" denotes a component and "t" denotes a tile number.

Figure 12:
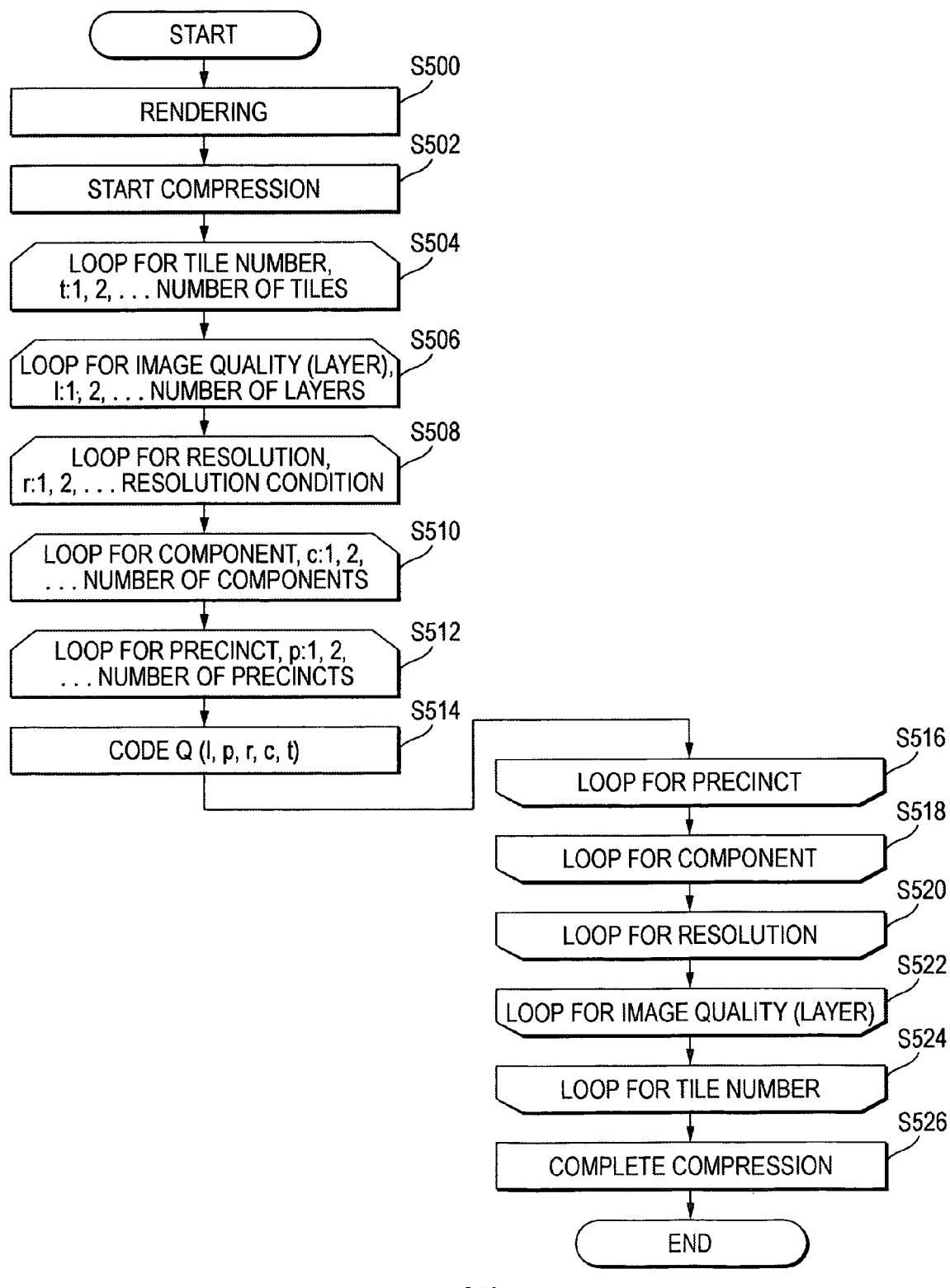
FIG. 12 is a flowchart showing a process (S50) in which the image forming system compresses the image data when a storage capacity of a buffer is less that an amount of image data, which has a predetermined image quality and is equivalent to a single page of paper.

FIG. 12 is a flowchart showing a process (S50) in which the image forming system 7 compresses image data in the case where the storage capacity of the buffer 78 is less than the amount of the image data, which is equivalent to a single page of paper and has a specific image quality.

As shown in FIG. 12, in step 500 (S500), the image input section 74 renders the obtained image data, and outputs the rendered image data to the image compressing section 76.

In step 502 (S502), the image compressing section 76 starts generating a code stream that can be decoded by a decoding device based on JPEG2000, from the image data input from the image input section 74 (begins compression based on JPEG2000).

In step 504 (S504), the image compressing section 76 starts a loop for tile number.

The image compressing section 76 starts the loop for tile number with the variable t equal to 1 and increments the variable t one by one while repeating processes to S524 until the variable t becomes equal to the number of tiles.

In step 506 (S506), the image compressing section 76 starts performing a loop for image quality (layer).

The image compressing section 76 starts the loop for image quality with the variable l equal to 1, and increments the variable l one by 1 while repeating processes to S522 until the variable l becomes equal to the number of layers.

In step 508 (S508), the image compressing section 76 starts a loop for resolution.

The image compressing section 76 starts the loop for image quality with the variable r equal to 1, and increments the variable r one by one while repeating processes to S520 until the variable r becomes equal to a predetermined resolution condition.

In step 510 (S510), the image compressing section 76 starts a loop for component.

The image compressing section 76 starts the loop for image quality with the variable c equal to 1, and increments the variable c one by one while repeating processes to S518 until the variable c becomes equal to the number of components.

In step 512 (S512), the image compressing section 76 starts a loop for precinct.

The image compressing section 76 starts the loop for image quality with the variable p equal to 1, and increments the variable p one by one while repeating processes to S516 until the variable p becomes equal to the number of precincts.

In step 514 (S514), the image compressing section 76 codes the packets Q (l, p, r, c, t).

In step 516 (S516), the image compressing section 76 terminates the loop for precinct if the condition of S512 is satisfied.

In step 518 (S518), the image compressing section 76 terminates the loop for component if the condition of S510 is satisfied.

In step 520 (S520), the image compressing section 76 terminates the loop for resolution if the condition of S508 is satisfied.

In step 522 (S522), the image compressing section 76 terminates the loop for image quality if the condition of S506 is satisfied.

In step 524 (S524), the image compressing section 76 terminates the loop for tile number if the condition of S504 is satisfied.

In step 526 (S526), the image compressing section 76 completes the process of generating the code stream that can be decoded by a decoding device based on JPEG2000 from the image data input from the image input section 74 (completes compression based on JPEG2000).

As described above, the image forming system 7 renders image data, and compresses the rendered image data so that the progression order of the plural tiles arranged in the sub scanning direction becomes LRCP. Further, if it is determined that the obtained restriction condition is satisfied while the code stream is being sequentially transmitted from the image storing section 80 to the buffer 78, the controller 72 stops transmitting the code stream of the tile number currently set, and starts compressing the next tile.

In the progression order, if the loop for image quality is externally defined with respect to the loop for resolution, the loop for component and the loop for precinct, an order of the loop for resolution, the loop for component, and the loop for precinct may be changed.

Next, a process will be described in which the buffer 78 reads (obtains) the code stream (image data), which is compressed and stored in the image storing section 80, and the image output section 84 prints the reproduction image in the case where the storage capacity of the buffer 78 is less than an amount of the image data, which is equivalent to a single page of paper and has the predetermined image quality.

Figure 13:
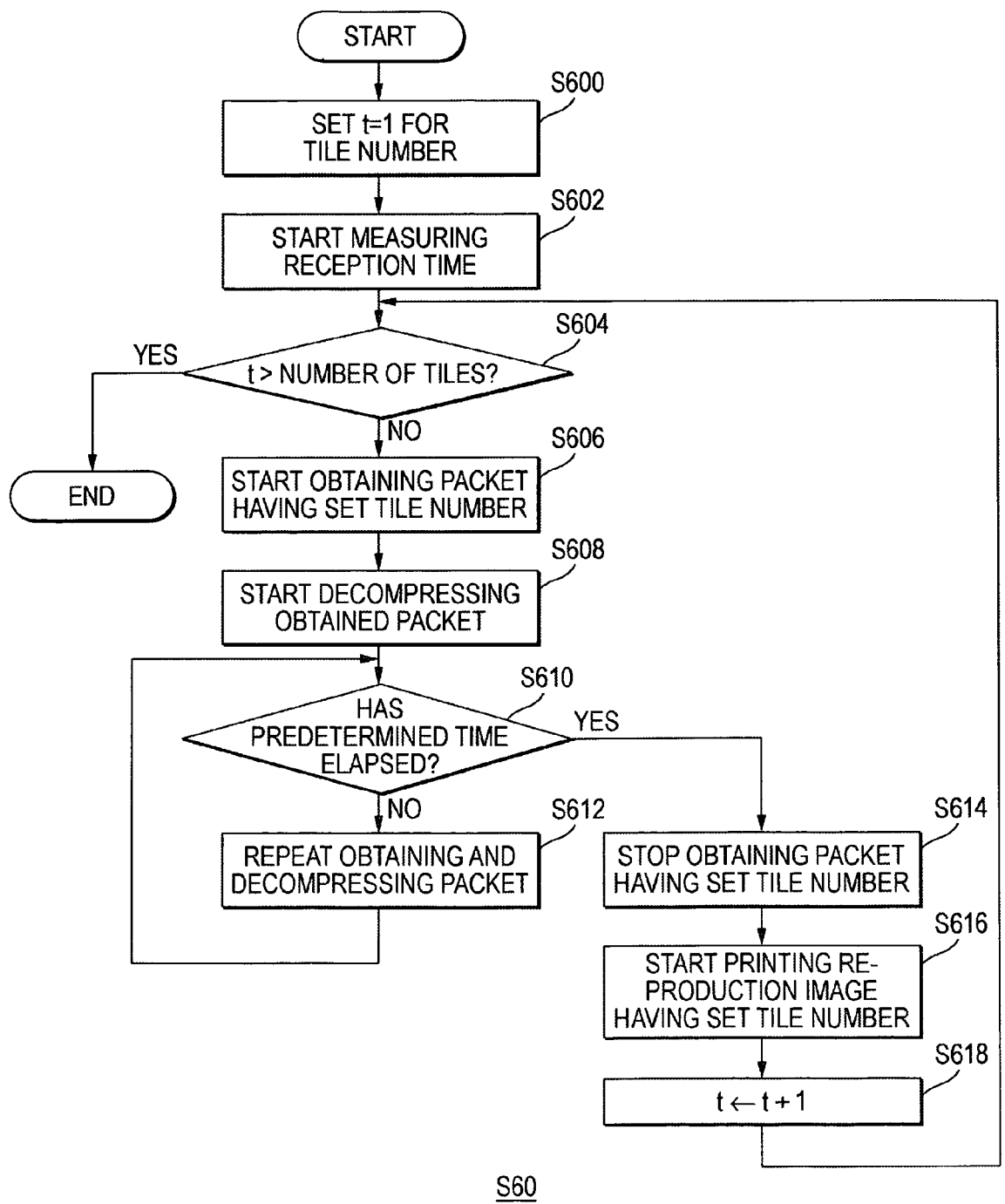
FIG. 13 is a flowchart showing a process (S60) in which the buffer reads (obtains) a code stream (image data) compressed and stored in the image storing section when the storage capacity of the buffer is less that the amount of image data, which has the predetermined image quality and is equivalent to the single page of paper, and then the image output section prints the reproduction image.

FIG. 13 is a flowchart showing a process (S60) in which the buffer 78 reads (obtains) the code stream (image data) compressed and stored in the image storing section 80, and the image output section 84 prints the reproduction image in the case where the storage capacity of the buffer 78 is less than the amount of the image data, which is equivalent to a single page of paper and has the predetermined image quality.

As shown in FIG. 13, in step 600 (S600), when it is started to transmit the code stream from the image storing section 80 to the buffer 78, the controller 72 sets the tile number t to 1 for the buffer 78.

In step 602 (S602), the controller 72 starts measuring a time required for the buffer 78 to obtain the code stream.

In step 604 (S604), the controller 72 determines whether or not the tile number t (variable t) is greater than a tile number included in a header of the code stream. If the tile number t is equal to or less than the tile number included in the header, the process proceeds to S606. If the tile number t is greater than the tile number included in the header, the process is terminated.

In step 606 (S606), the buffer 78 starts receiving a packet having the set tile number.

In step 608 (S608), the image decompressing section 82 starts decompressing the packet obtained by the buffer 78.

In step 610 (S610), the controller 72 determines whether or not a time for which the buffer 78 obtains the code stream reaches the predetermined time (that is, whether or not the predetermined time has elapsed since the buffer started obtaining the code stream). If it does not reach the predetermined time, the process proceeds to S612. Otherwise, the process proceeds to S614.

In step 612 (S612), the buffer 78 continues obtaining the packets, and image decompressing section 82 continues decompressing the packets. Then, the process returns to S610.

In step 614 (S614), the controller 72 controls the buffer 78 to stop obtaining the packets having the set tile number.

In step 616 (S616), the image output section 84 receives the packet decompressed by the image decompressing section 82 and starts printing a reproduction image by.

In step 618 (S618), the controller 72 increments the tile number t (variable t) by one, and sets the incremented tile number t for the buffer 78.

As described above, when the image output section 84 obtains the decompressed image data decompressed through the image storing section 80, the buffer 78 and the image decompressing section 82, the image output section 84 forms images for the respective tiles shown in FIG. 3 in the predetermined progression order and outputs the reproduction image having the predetermined image quality as a printed material.

The image compressing section 76 may divide the input image into tiles in a two-dimensional direction, that is, a main scanning direction and a sub-scanning direction (see FIG. 7). Even when the input image is divided into tiles in the two-dimensional direction, the image compressing section 76 determines a progression order so that progress transferring is sequentially performed in the raster order, to thereby compress the image data. When the input image is divided into tiles in the two-dimensional direction, the code stream output from the image compressing section 76 is packetized into plural packets Q (l, p, r, c, tx, ty) represented by six variables where "l" denotes an image quality (layer), "p" denotes a two-dimensional precinct p of an image, "r" denotes a resolution, "c" denotes a component, "tx" denotes a tile number in the main scanning direction (direction x), and "ty" denotes a tile number in the sub scanning direction (direction y).

Figure 14:
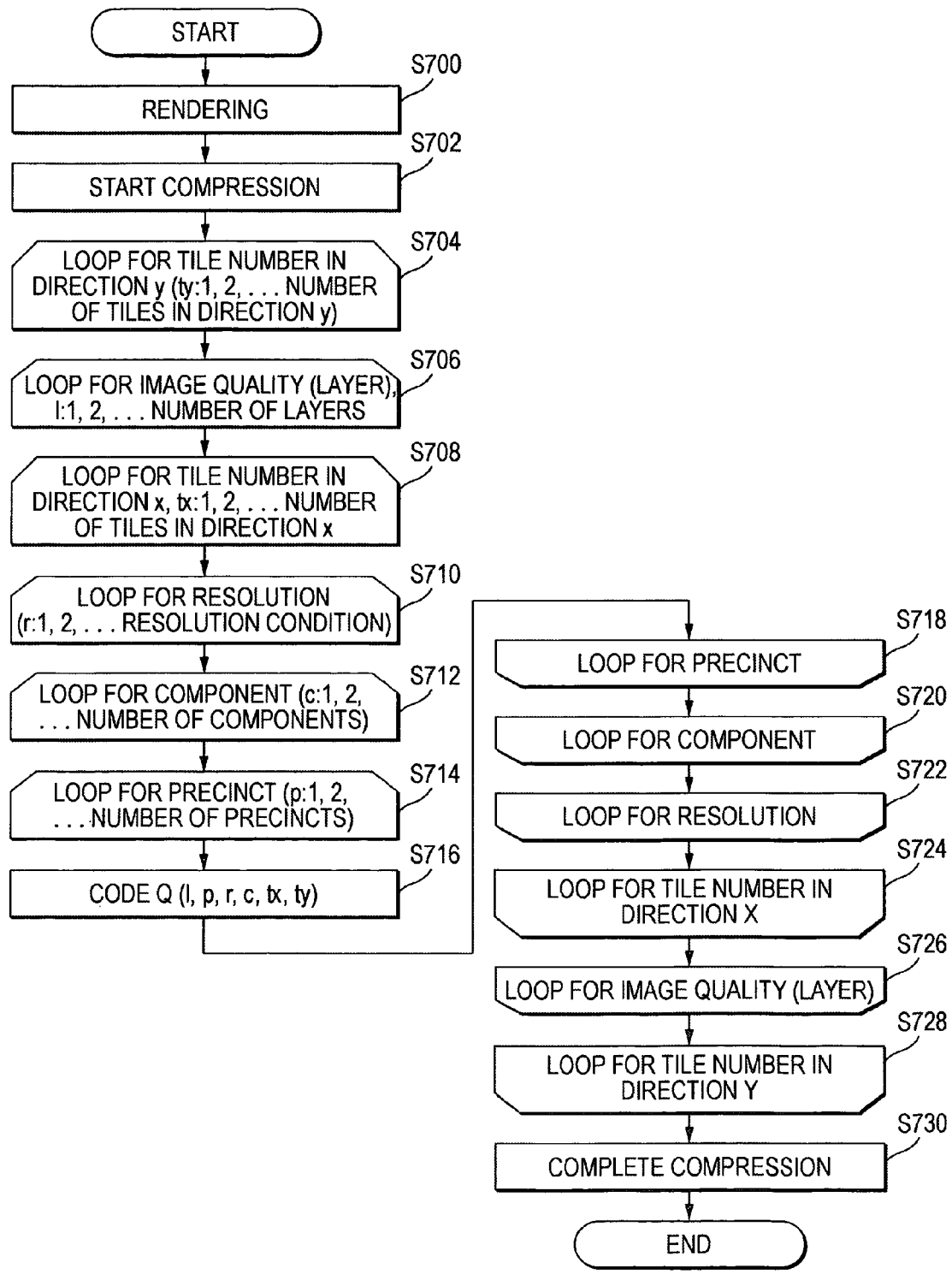
FIG. 14 is a flowchart showing a process (S70) in which the image compressing section divides an input image into tiles in a two-dimensional direction and compresses the image data.

FIG. 14 is a flowchart showing a process (S70) in which the image compressing section 76 divides input image into tiles in a two-dimensional direction and compresses the image data.

As shown in FIG. 14, in step 700 (S700), the image input section 74 renders the obtained image data, and outputs the rendered image data to the image compressing section 76.

In step 702 (S702), the image compressing section 76 starts generating a code stream that can be decoded by a decoding device based on JPEG2000, from the image data input from the image input section 74 (compression based on JPEG2000 begins).

In step 704 (S704), the image compressing section 76 starts a loop for tile number in the sub scanning direction (direction y).

The compressing unit starts the loop for tile number in the y direction with the variable ty equal to 1, and increments the variable ty one by one while repeating processes to S728 until the variable ty becomes equal to the number of tiles in direction y.

In step 706 (S706), the image compressing section 76 starts a loop for image quality (layer).

The image compressing section 76 starts the loop for image quality with the variable l equal to 1, and increments the variable l one by one while repeating processes to S726 until the variable l becomes equal to the number of layers.

In step 708 (S708), the image compressing section 76 starts a loop for tile number in the main scanning direction (direction x).

The image compressing section 76 starts the loop for tile number in the x direction with the variable tx equal to 1, and increments the variable tx one by one while repeating processes to S724 until the variable tx becomes equal to the number of tiles in direction x.

In step 710 (S710), the image compressing section 76 starts a loop for resolution.

The image compressing section 76 starts the loop for image quality with the variable r equal to 1, and increments the variable r one by one while repeating processes to S722 until the variable r becomes equal to a specific resolution condition.

In step 712 (S712), the image compressing section 76 starts a loop for component.

The image compressing section 76 starts the loop for image quality with the variable c equal to 1, and increments the variable c one by one while repeating processes to S720 until the variable c becomes equal to the number of components.

In step 714 (S714), the image compressing section 76 starts a loop for precinct.

The image compressing section 76 starts the loop for image quality with the variable p equal to 1, and increments the variable p one by one while repeating processes to S718 until the variable p becomes equal to the number of precincts.

In step 716 (S716), the image compressing section 76 codes the packets Q (l, p, r, c, tx, ty).

In step 718 (S718), the image compressing section 76 terminates the loop for precinct if the condition of S714 is satisfied.

In step 720 (S720), the image compressing section 76 terminates the loop for component if the condition of S712 is satisfied.

In step 722 (S722), the image compressing section 76 terminates the loop for resolution if the condition of S710 is satisfied.

In step 724 (S724), the image compressing section 76 terminates the loop for image quality if the condition of S708 is satisfied.

In step 726 (S726), the image compressing section 76 terminates the loop for tile number if the condition of S706 is satisfied.

In step 728 (S728), the image compressing section 76 terminates the loop for tile number if the condition of S704 is satisfied.

In step 730 (S730), the image compressing section 76 completes the process of generating the code stream that can be decoded by a decoding device based on JPEG2000 from the image data input from the image input section 74 (completes compression based on JPEG2000).

Further, when the image compressing section 76 divides the input image into tiles in the two-dimensional direction, the progression order becomes equivalent to the raster order. Thus, the image compressing section 76 compresses the image data so that the image decompressing section 84 can decompress the compressed image data in units of image areas in which tiles are arranged in the main scanning direction and that the image output section 84 can print the decompressed image data.

Next, a third exemplary embodiment of the invention will be described with reference to the accompanying drawings.

Figure 15:
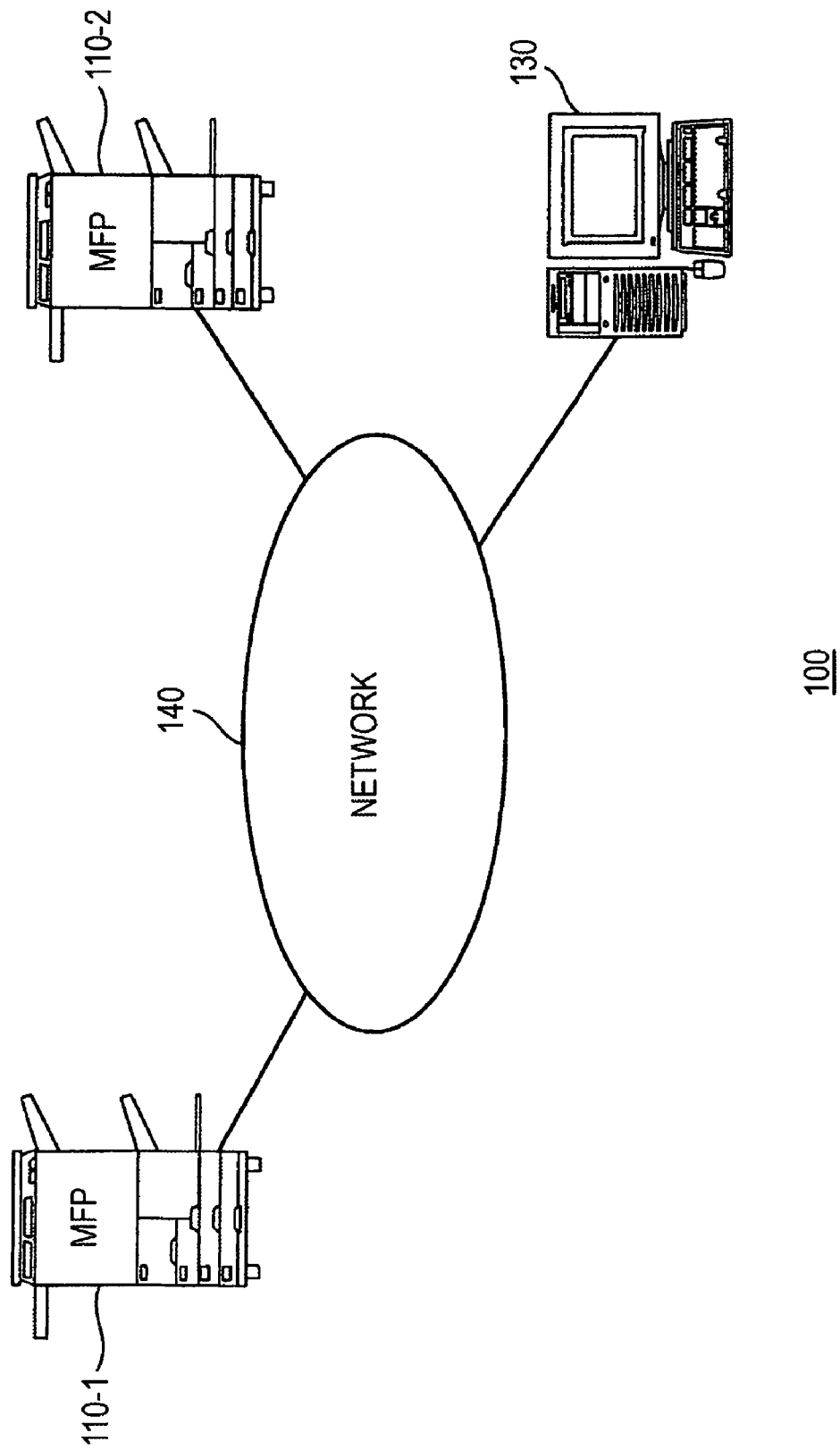
FIG. 15 is a view of an image transferring system according to a third exemplary embodiment of the invention.

FIG. 15 shows an image transferring system 100 according to the third exemplary embodiment of the invention. In the image transferring system 100, image forming apparatuses 110-1 and 110-2 having a FAX function and a PC (Personal Computer) 130 having a fax function are connected through a network 140. The network 140 may be wire or wireless network. In the image forming apparatuses 110-1 and 110-2 and the PC 130, a function for transmitting and receiving image data is not limited to FAX, but other transmitting and receiving methods based on another communication protocol may be used.

Figure 16:
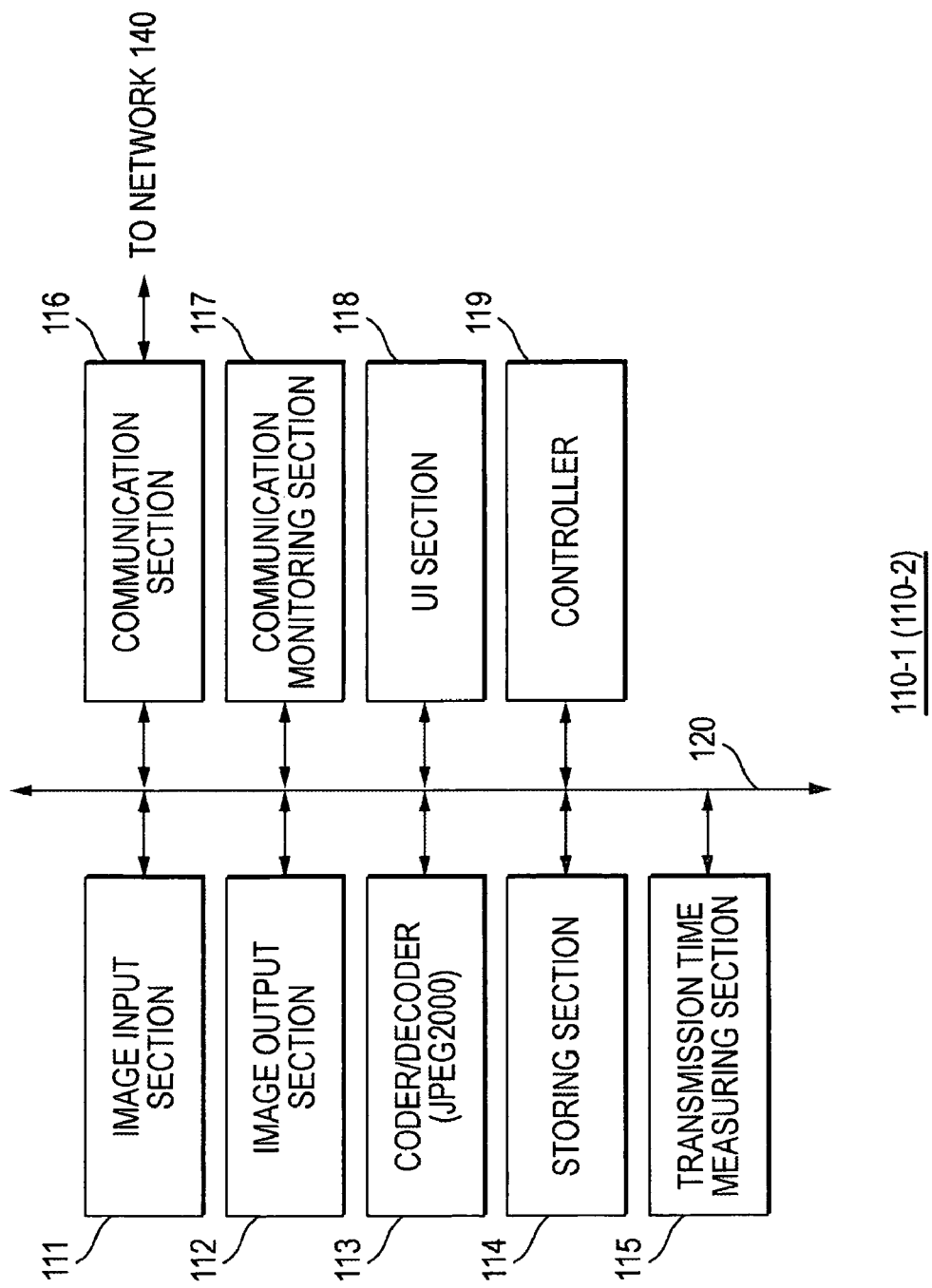
FIG. 16 is a block diagram showing a configuration of an image forming apparatus.

FIG. 16 shows a configuration of the image forming apparatus 110-1. The image forming apparatus 110-1 may be a multi-function printer (MFP) functioning as, for example, a copier, a facsimile and a printer. Further, in the image forming apparatus 110-1, an image input section 111, an image output section 112, a coder/decoder 113, a storing section 114, a transmission-time measuring section 115, a communication section 116, a communication monitoring section 117, a user interface (UI) section 118, and a controller 119 are connected to one another through a system bus 120. The image forming apparatus 110-2 may have the same configuration as that of the image forming apparatus 110-1.

The image input section 111 may be a scanner. Further, the image input section 111 reads an image formed on a recording medium such as a sheet of paper, and outputs a multilevel image data, for example. Moreover, the image input section 111 may be a decomposer of image data for outputting an image, or a reading unit for reading image data from a CD-ROM. The image output section 112 includes a recording medium supplier (not shown), and receives image data to be output and forms an image on a recording medium.

The coder/decoder 113 includes a decoder (not shown) based on JPEG2000, and a coder (not shown) that generates a code stream that can be decoded by the decoder. Further, the coder/decoder 113 codes and decodes an image. In order to reduce deterioration of image quality that occurs when a portion of image data embedded-coded is not received, the coder/decoder 113 may lossless-code the image data. The storing section 114 may include a HDD, and stores the image data. The transmission-time measuring section 115 measures a transmission time when the image forming apparatus 110-1 transmits the image data.

The communication section 116 transmits the image-data and other signals to a separate terminal through the network 140, and receives the image data and the other signals from the separate terminal. The communication monitoring section 117 monitors a communication status of the communication section 116, and outputs the monitoring result.

The UI section 118 may include a touch panel. Also, the UI section 118 receives a user's instruction and outputs the received user's instruction to the controller 119, and displays information about operation of the image forming apparatus 110-1. The controller 119 may include a CPU, and controls each element of the image forming apparatus 110-1 in accordance with the user(s instruction input through the UI section 118 and a signal input through the communication section 116.

The PC 130 shown in FIG. 15 has the same configuration as those of elements included in the image forming apparatuses 110-1 and 110-2 except that an image is displayed on a display unit instead of being formed on a recording medium.

Next, a process will be described in which the image transmitting system 100 transmits image data by exemplifying the case where the image forming apparatus 110-1 transmits image data to the image forming apparatus 110-2.

Figure 17:
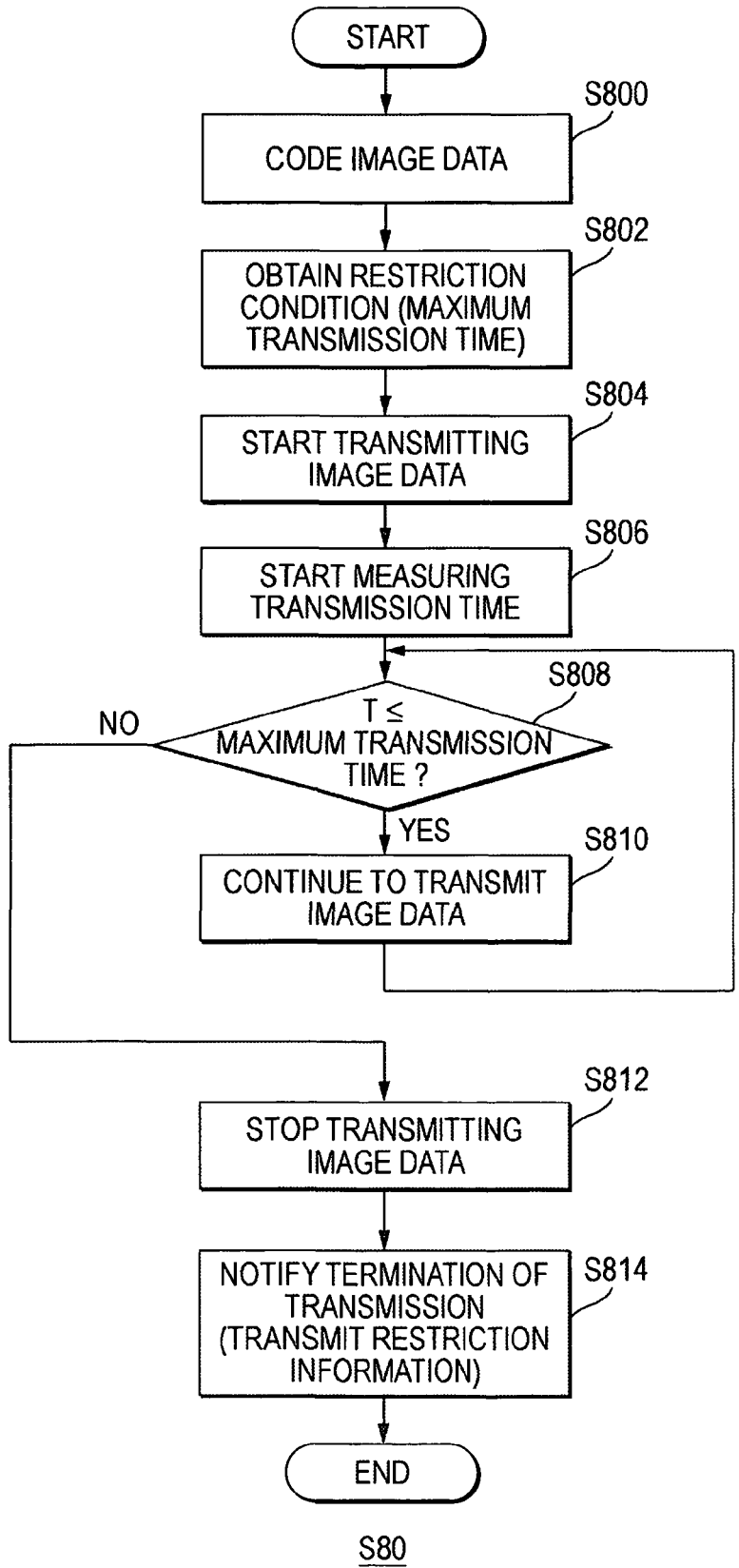
FIG. 17 is a flowchart showing a process (S80) in which the image forming apparatus transmits image data to another image forming apparatus.

FIG. 17 is a flowchart showing a process (S80) in which the image forming apparatus 110-1 transmits image data to the image forming apparatus 110-2.

As shown in FIG. 17, in step 800 (S800), the image forming apparatus 110-1 causes, for example, the coder/decoder 113 to code the image data stored in the storing section 114.

In step 802 (S802), the controller 119 of the image forming apparatus 110-1 obtains, through the UI section 118, a restriction condition which is applied to transmission of the image data. For example, the restriction condition for the transmission of the image data may restrict a time for transmitting the image data (maximum transmission time).

In step 804 (S804), the communication section 116 of the image forming apparatus 110-1 starts transmitting compressed image data under the control by the controller 119.

In step 806 (S806), the transmission-time measuring section 115 of the image forming apparatus 110-1 starts measuring a transmission time t of the image data.

In step 808 (S808), the controller 119 of the image forming apparatus 110-1 determines whether or not the transmission time t of the image data is equal to or less than a maximum transmission time obtained in S802. If the transmission time t of the image data is equal to or less than the maximum transmission time, the process proceeds to S810. Otherwise, the process proceeds to S812.

In step 810 (S810), the communication section 116 of the image forming apparatus 110-1 continues transmitting the compressed image data under the control by the controller 119.

In step 812 (S812), the communication section 116 of the image forming apparatus 110-1 stops transmitting the compressed image data under the control by the controller 119.

In step 814 (S814), the communication section 116 of the image forming apparatus 110-1 transmits a signal indicating the termination of the image data (restriction information: a signal indicating that the image data is restricted) under the control by the controller 119.

The restriction condition used in the case where the image forming apparatus 110-1 transmits the image data may be a condition that restricts an amount of image data to be transmitted (maximum transmission data size) so that the amount of image data to be transmitted is equal to or less than a predetermined amount.

Figure 18:
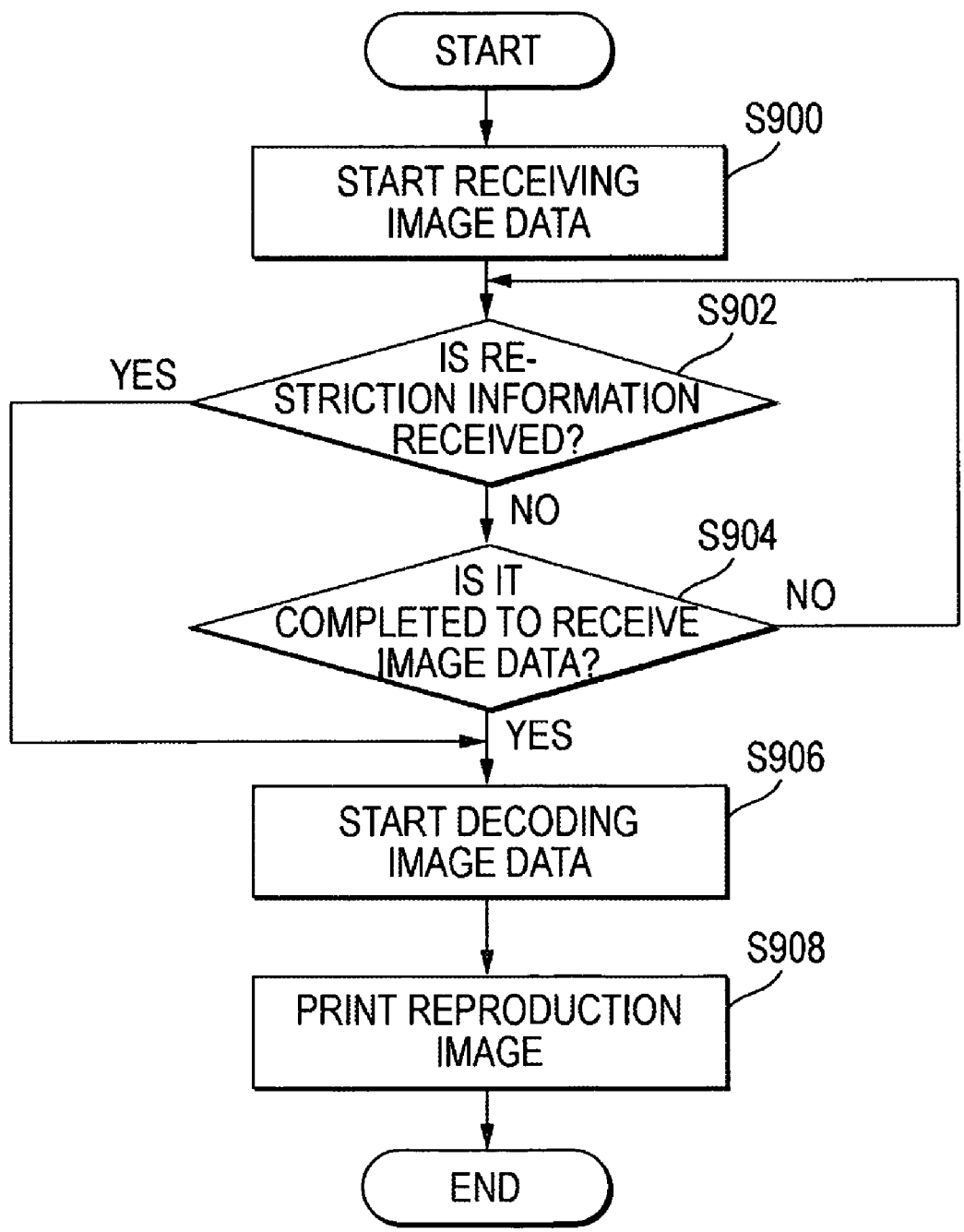
FIG. 18 is a flowchart showing a process (S90) in which the image forming apparatus receives image data from another image forming apparatus.

FIG. 18 is a flowchart showing a process, (S90) in which the image forming apparatus 110-2 receives image data from the image forming apparatus 110-1.

As shown in FIG. 18, in step 900 (S900), the communication section 116 of the image forming apparatus 110-2 starts receiving the image data in response to the data transmission started in the image forming apparatus 110-1.

In step 902 (S902), the controller 119 of the image forming apparatus 110-2 determines whether or not the communication section 116 receives the restriction information. If the controller 119 determines that the restriction information is not to received, the process proceeds to S904. Otherwise, the process proceeds to S906.

In step 904 (S904), the controller 119 of the image forming apparatus 110-2 determines whether or not the communication section 116 completes receiving the image data. If the controller 119 determines that the receiving process of the image data is completed, the process proceeds to S906. Otherwise, the process returns to S902.

In step 906 (S906), the coder/decoder 113 of the image forming apparatus 110-2 starts decoding the image data.

In step 908 (S908), the image output section 112 of the image forming apparatus 110-2 receives the decoded image data, forms an image on a recoding medium, and outputs the image (prints a reproduction image).

As described above, when receiving the entire image data transmitted from the image forming apparatus 110-1 and/or when receiving the restriction information, the image forming apparatus 110-2 starts decoding the image data, and prints the reproduction image.

What is claimed is:

1. An image forming system comprising:
  a host device; and
  a terminal device connected to the host device,
  wherein the host device comprises:
    a compressing unit that generates a code stream including an embedded bit stream from original image data;
    a code-stream transmitting unit that transmits the code stream generated by the compressing unit;

a control-signal receiving unit that receives a control signal transmitted by the terminal device; and a first controller that controls the code-stream transmitting unit in accordance with the control signal received by the control-signal receiving unit, wherein the terminal device comprises:

a code-stream receiving unit that receives the code stream transmitted by the code-stream transmitting unit;

a decompressing unit that generates reproduction image data from the code stream received by the code-stream receiving unit;

a reproduction-image outputting unit that receives the reproduction image data generated by the decompressing unit and outputs a reproduction image based on the reproduction image data;

a second controller that restricts receiving operation of the code-stream receiving unit according to a predetermined condition;

a control-signal transmitting unit that transmits the control signal when the second controller restricts the receiving operation of the code-stream receiving unit; and an operation-mode switching unit that allows a user to switch an operation mode of the terminal device between a speed priority operation mode and a quality priority operation mode, wherein the original image is divided into one or more tiles formed in a main scanning direction when a size of the original image is larger than a storage buffer size of the terminal device, wherein the predetermined condition relates to a predetermined time, wherein when a time, beginning from when the code-stream receiving unit starts receiving the code stream, reaches the predetermined time, the second controller restricts the receiving operation of the code-stream receiving unit for each tile, wherein the reproduction-image outputting unit is configured to output the reproduction image for each tile based on the code stream that the code-stream receiving unit has received from the code-stream transmitting unit until the time reaches the predetermined time, wherein if the operation mode of the terminal device is switched to the speed priority operation mode, the second controller controls the control-signal transmitting unit to output the control signal on a basis of a data amount of the code stream received by the code-stream receiving unit and the time, beginning from when the code-stream receiving unit starts receiving the code stream, and wherein if the operation mode of the terminal device is switched to the quality priority operation mode, the second controller controls the control-signal transmitting unit to output the control signal on the basis of only the data amount of the code stream received by the code-stream receiving unit.

2. The system according to claim 1, wherein the compressing unit uses a compression method of JPEG2000.

3. The system according to claim 1, wherein the compressing unit generates the code stream for each of the one or more tiles, the code stream which can be decompressed by the decompressing unit of the terminal device into the reproduction image data having quality according to the data amount of the code stream that the code-stream receiving unit of the terminal device receives, and wherein the reproduction-image outputting unit continuously outputs the reproduction image for each of the one or more tiles.

4. The image forming system according to claim 1, wherein the code stream generated by the compression unit includes number of tiles, number of layers, resolution condition, number of components and number of precincts, and wherein the compressing unit is configured to perform an iterative process for each of the individual categories of the compression unit, performing each iterative process separately for tiles, number of layers, resolution condition, number of components and number of precincts.

5. An image forming system comprising:

a host device; and a terminal device connected to the host device, wherein the host device comprises:

a compressing unit that generates a code stream including an embedded bit stream, from original image data;

a code-stream transmitting unit that transmits the code stream generated by the compressing unit;

a control-signal receiving unit that receives a control signal transmitted by the terminal device; and a first controller that turns on/off the code-stream transmitting unit in accordance with the control signal received by the control-signal receiving unit, wherein the terminal device comprises:

a code-stream receiving unit that receives the code stream transmitted by the code-stream transmitting unit;

a decompressing unit that generates reproduction image data from the code stream received by the code-stream receiving unit;

a reproduction-image outputting unit that receives the reproduction image data generated by the decompressing unit and outputs a reproduction image based on the reproduction image data;

an operation-mode switching unit that allows a user to switch an operation mode of the terminal device between a first operation mode and a second operation mode;

a second controller that, under the first operation mode, restricts receiving operation of the code-stream receiving unit according to a time beginning from when the code-stream receiving unit starts receiving the code stream and continuing for a predetermined time, the second controller that, under the second operation mode, does not restrict the receiving operation of the code-stream receiving unit; and a control-signal transmitting unit that transmits the control signal when the operation mode switches from one of the first and second operation modes to the other, wherein the original image is divided into one or more tiles formed in a main scanning direction when a size of the original image is larger than a storage buffer of the terminal device, and wherein the reproduction-image outputting unit is configured to output the reproduction image for each tile based on the code stream that the code-stream receiving unit has received from the code-stream transmitting unit until the time reaches the predetermined time, wherein if the operation mode of the terminal device is switched to the first operation mode, the second controller controls the control-signal transmitting unit to output the control signal on a basis of a data amount of the code stream received by the code stream receiving unit and the time, beginning from when the code-stream receiving unit starts receiving the code stream, and wherein if the operation mode of the terminal device is switched to the second operation mode, the second controller controls the control-signal transmitting unit to output the control signal on the basis of only the data amount of the code stream received by the code-stream receiving unit.

6. The system according to claim 5,
wherein the compressing unit generates the code stream for each of the one or more tiles, the code stream which can be decompressed by the decompressing unit of the terminal device into the reproduction image data having quality according to a data amount of the code stream that the code-stream receiving unit of the terminal device receives, and
wherein the reproduction-image outputting unit continuously outputs the reproduction image for each of the one or more tiles.

7. An image forming system comprising:
a first storing unit that stores image data coded with an embedded coding;
a second storing unit that obtains and stores the image data stored in the first storage unit and stores the image data;
a decompressing unit that decompresses the image data stored in the second storage;
an image output unit that outputs a reproduction image corresponding to the image data decompressed by the decompressing unit;
an operation-mode switching unit that allows a user to switch an operation mode of the second storing unit between a speed priority operation mode and a quality priority operation mode; and
a controller that restricts an amount of the image data obtained by the second storing unit from the first storing unit, according to a predetermined condition,
wherein the image data stored in the first storing unit is divided into one or more tiles when a size of the image data stored in the first storing unit is larger than a storage buffer size of the first storing unit,
wherein the predetermined condition relates to a predetermined time,
wherein when a time, beginning from when the second storing unit starts receiving the coded image data from the first storing unit, reaches the predetermined time, the controller restricts the receiving operation of the second storing unit for each tile,
wherein the image output unit is configured to output a reproduction image for each tile based on the coded image data that the second storing unit has been received from the first storing unit until the time reaches the predetermined time,
wherein the second storing unit transmits a control signal to the first storing unit when the controller restricts the receiving operation of the second storing unit,
wherein if the operation mode of the second storing unit is switched to the speed priority operation mode, the controller controls the second storing unit to output the control signal on a basis of the amount of the image data obtained by the second storing unit from the first storing unit and the time, beginning from when the second storing unit starts receiving the coded image data from the first storing unit, and
wherein if the operation mode of the second storing unit is switched to the quality priority operation mode, the controller controls the second storing unit to output the control signal on the basis of only the amount of the image data obtained by the second storing unit from the first storing unit.

8. The system according to claim 7, further comprising:
a condition obtaining unit that obtains the predetermined condition,
wherein the controller restricts the amount of the image data obtained by the second storing unit from the first storing unit, according to the predetermined condition obtained by the condition obtaining unit.

9. The system according to claim 7, wherein the second storing unit obtains the image data from the first storing unit in units of image data corresponding to an image that is to be output onto a single surface by the image output unit.

10. The system according to claim 7, wherein the second storing unit obtains the image data from the first storing unit in units of image data corresponding to an area defined with respect to a main scanning direction of an image that is to be output from the image output unit.

11. The system according to claim 7, further comprising:
a compressing unit that codes the image data using the embedded coding,
wherein the first storing unit stores the image data coded by the compressing unit with the embedded coding.

12. The system according to claim 11, wherein the compressing unit uses a compression method of JPEG2000 in which priority is given to an image quality.

13. An image transmitting apparatus comprising:
a coding unit that codes image data using an embedded coding;
an image-data transmitting unit that transmits the image data embedded-coded by the coding unit;
a controller that restricts an amount of the image data transmitted by the image-data transmitting unit;
an operation-mode switching unit that allows a user to switch an operation mode of the image transmitting apparatus between a speed priority operation mode and a quality priority operation mode,
a restriction-information transmitting unit that transmits restriction information, which indicates that the controller restricts the amount of the image data,
wherein the image data embedded-coded by the coding unit is divided into one or more tiles when a size of the image data embedded-coded by the coding unit is larger than a storage buffer size,
wherein when a time, beginning from when the image data transmitting unit starts transmitting the image data, reaches a predetermined time, the controller restricts the transmitting operation of the image-data transmitting unit to restrict the amount of the image data transmitted by the image-data transmitting unit for each tile,
wherein the image transmitting apparatus further comprises a reproduction-image outputting unit which is configured to output a reproduction image for each tile based on the image data embedded-coded by the coding unit, that the image-data transmitting unit transmits until the time reaches the predetermined time,
wherein if the operation mode of the image transmitting apparatus is switched to the speed priority operation mode, the controller controls the restriction-information transmitting unit to output the restriction information on a basis of the amount of the image data transmitted by the image-data transmitting unit and the time, beginning from when the image-data transmitting unit starts transmitting the image data, and wherein if the operation mode of the image transmitting apparatus is switched to the quality priority operation mode, the controller controls the restriction-information transmitting unit to output the restriction information on the basis of only the amount of the image data transmitted by the image-data transmitting unit.

14. The image transmitting apparatus according to claim 13, wherein the controller restricts the amount of the image data transmitted by the image-data transmitting unit so that the image data transmitted by the image-data transmitting unit is equal to or smaller than a predetermined amount.

15. An image transmitting system comprising:
an image transmitting apparatus; and
an image receiving apparatus,
wherein the image transmitting apparatus comprises:
   a coding unit that codes image data using an embedded coding;
   an image-data transmitting unit that transmits the image data embedded-coded by the coding unit;
   a controller that restricts an amount of the image data transmitted by the image-data transmitting unit according to a predetermined condition; and
   a restriction-information transmitting unit that transmits restriction information, which indicates that the controller restricts the amount of the image data,
wherein the image receiving apparatus comprises:
   an image data receiving unit that receives the image data transmitted by the image-data transmitting unit;
   a restriction information receiving unit that receives the restriction information transmitted by the restriction-information transmitting unit;
   a decoding unit that starts decoding the image data received by the image data receiving unit on a basis of the restriction information received by the restriction information receiving unit;
   an image output unit that receives the image data decoded by the decoding unit and outputs a reproduction image based on the received image data; and
   an operation-mode switching unit that allows a user to switch an operation mode of the image receiving apparatus between a speed priority operation mode and a quality priority operation mode,
wherein the image data embedded-coded by the coding unit is divided into one or more tiles when a size of the image data embedded-coded by the coding unit is larger than a storage buffer size of the image receiving apparatus,
wherein when a time, beginning from when the image data receiving unit starts receiving the image data reaches a predetermined time, the controller restricts the transmitting operation of the image-data transmitting unit for each tile, and
wherein the image output unit is configured to output the reproduction image for each tile based on the amount of the image data transmitted by the image-data transmitting unit until the time reaches the predetermined time,
wherein if the operation mode of the image receiving apparatus is switched to the speed priority operation mode, the controller controls the restriction-information transmitting unit to transmit the restriction information on the basis of the amount of the image data transmitted by the image-data transmitting unit and the time, beginning from when the image data receiving unit starts receiving the image data, and
wherein if the operation mode of the image transmitting apparatus is switched to the quality priority operation mode, the controller controls the restriction-information transmitting unit to output the restriction information on the basis of only the amount of the image data transmitted by the image-data transmitting unit.

* * * * *